United States Patent
Boyd et al.

(10) Patent No.: US 12,199,738 B2
(45) Date of Patent: Jan. 14, 2025

(54) DYNAMIC MANAGEMENT OF SOFTWARE-DEFINED SERVICE CHAINS FOR SATELLITE COMMUNICATIONS

(71) Applicant: KRATOS INTEGRAL HOLDINGS, LLC, San Diego, CA (US)

(72) Inventors: Christopher Boyd, Topsfield, MA (US); Greg Quiggle, Leesburg, VA (US); Scott Kubina, Monument, CO (US); Luis Gomez, Palo Alto, CA (US); Richard Monteleone, Colorado Springs, CO (US); Mark Trynor, Colorado Springs, CO (US); Daniel De La Rosa, San Jose, CA (US); James Pritchett, Colorado Springs, CO (US); Stuart Daughtridge, Huntingtown, MD (US); Frank Sandoval, Denver, CO (US)

(73) Assignee: KRATOS INTEGRAL HOLDINGS, LLC, San Diego, CA (US)

( * ) Notice: Subject to any disclaimer, the term of this patent is extended or adjusted under 35 U.S.C. 154(b) by 484 days.

(21) Appl. No.: 17/697,320

(22) Filed: Mar. 17, 2022

(65) Prior Publication Data

US 2023/0299843 A1 Sep. 21, 2023

(51) Int. Cl.
H04B 7/185 (2006.01)
H04W 48/18 (2009.01)

(52) U.S. Cl.
CPC ..... *H04B 7/18519* (2013.01); *H04B 7/18521* (2013.01); *H04B 7/18532* (2013.01); *H04W 48/18* (2013.01)

(58) Field of Classification Search
CPC ............ H04B 7/18519; H04B 7/18521; H04B 7/18532; H04W 48/18
See application file for complete search history.

(56) References Cited

U.S. PATENT DOCUMENTS

2019/0208404 A1 7/2019 Georgiev
2021/0184925 A1 6/2021 Narayanan et al.
(Continued)

FOREIGN PATENT DOCUMENTS

WO 2019018720 A1 1/2019

OTHER PUBLICATIONS

International Search Report and Written Opinion dated Nov. 7, 2022 of International Patent Application No. PCT/US2022/020715.

*Primary Examiner* — Keith Ferguson
(74) *Attorney, Agent, or Firm* — Procopio, Cory, Hargreaves & Savitch LLP

(57) ABSTRACT

Conventionally, software-based services that utilize satellites are manually and painstakingly configured, provisioned, activated, and calibrated, because the complexity and variability of satellite links prevent automated and scalable service orchestration. Accordingly, systems and processes are disclosed for automated and scalable orchestration of services that utilize satellite links. In response to a service request, comprising a service definition for an end-to-end service, parameter(s) of a satellite link that satisfies the service definition may be calculated. These parameter(s) may be used to select a configuration for a satellite-network service chain, comprising a plurality of virtual network functions, from a service catalog. The satellite-network service chain may then be instantiated, within a cloud infrastructure, using the selected configuration. This process may be implemented in a software-defined network controller which dynamically manages the resources and configuration of the service chain.

23 Claims, 8 Drawing Sheets

(56) References Cited

U.S. PATENT DOCUMENTS

2021/0399798 A1   12/2021   Semiao et al.
2022/0361084 A1*  11/2022   Cui ..................... H04L 41/5054

* cited by examiner

600

DYNAMIC MANAGEMENT OF SOFTWARE-DEFINED SERVICE CHAINS FOR SATELLITE COMMUNICATIONS

BACKGROUND

Field of the Invention

The embodiments described herein are generally directed to satellite communications, and, more particularly, to dynamic management of software-defined service chains for satellite communications.

Description of the Related Art

The telecom industry has transitioned to scalable service-oriented provisioning platforms, enabled by Operational Support Systems (OSS), to manage customers' end-to-end service requests. Service providers use OSS to drive the provisioning and activation of customer-requested services down through software subsystems which use rule-based programming to configure the physical and virtual network elements that provide the communications circuits or pathways to enable the services. This process is known as "service orchestration."

However, such service orchestration has not previously been possible for services provided using satellite communications, due to the variability, complexity, and often proprietary elements involved in satellite links. For example, satellite links are subject to numerous dynamic conditions which do not similarly affect terrestrial links which have fixed links with known physical properties. The dynamic conditions affecting satellite links include radio frequency (RF) interference, atmospheric characteristics, antenna conditions, path length, and the like, which can all affect the throughput of a satellite link. Degradation of the satellite link may result in the violation of a service level agreement (SLA) between a service provider and its customer. In addition, the configuring and provisioning of satellite resources is more complicated than in terrestrial networks, since new network elements cannot simply and inexpensively be added to or activated within a satellite to address changing conditions.

As a result, services that utilize satellites are usually manually and painstakingly configured, provisioned, activated, and calibrated. Furthermore, due to closed-system design and the proprietary elements that are often used for services, providers must write custom middleware to interface the proprietary elements. This prevents the ability to automate and scale the orchestration of services through satellite links across the entire system required to create and manage a service lifecycle.

SUMMARY

Accordingly, systems and methods are disclosed to dynamically manage software-defined service chains for satellite communications in an automated and scalable manner.

In an embodiment, a method comprises, by a software-defined network (SDN) controller: receiving a service request comprising a service definition for an end-to-end service; calculating one or more parameters of a satellite link that satisfies the service definition; selecting a configuration for a satellite-network service chain from a service catalog based on the calculated one or more parameters, wherein the satellite-network service chain comprises a plurality of virtual network functions; and initiating instantiation of the satellite-network service chain in the selected configuration.

The service request may be received from a service orchestration system over at least one network, and the method may further comprise, by the SDN controller, prior to receiving the service request: receiving a request for service interface points from the service orchestration system over the at least one network; and, in response to the request, retrieving a list of available service interface points, and sending the list of available service interface points to the service orchestration system over the at least one network. Retrieving the list of available service interface points may comprise retrieving a list of gateways and terminals via an application programming interface of a network management system over the at least one network.

The service definition may define a Carrier Ethernet (CE) service.

The service definition may identify a gateway and a terminal and comprise one or more service parameters that define a service level agreement. The one or more service parameters may comprise a committed information rate and an excess information rate. The one or more service parameters may further comprise a maximum information rate. The method may further comprise, after instantiation of the satellite-network service chain: monitoring one or more key performance indicators of the satellite-network service chain; and, when the one or more key performance indicators do not satisfy the service parameters, select a new configuration for the satellite-network service chain from the service catalog based on the calculated one or more parameters, and update the satellite-network service chain to the new configuration. Updating the satellite-network service chain may comprise instantiating a new satellite-network service chain in the new configuration, migrating traffic from the satellite-network service chain to the new satellite-network service chain, and terminating the satellite-network service chain in the configuration.

The one or more parameters may be a link budget.

The configuration may comprise one or more dimensions of computing resources to be allocated to the plurality of virtual network functions in a cloud computing environment.

Initiating instantiation of the satellite-network service chain may comprise sending a service chain request, comprising the configuration, to a network management system over at least one network. The method may further comprise, by the network management system: receiving the service chain request from the SDN controller over the at least one network; and, in response to the service chain request, sending an instantiation request to a network functions virtualization (NFV) orchestrator over the at least one network. The method may further comprise, by the NFV orchestrator: receiving the instantiation request from the network management system over the at least one network; and, in response to the instantiation request, instantiating the plurality of virtual network functions within a cloud computing environment. The instantiation request may comprise a gateway configuration for a satellite service chain, and the method may further comprise, by the network management system in response to the service chain request, sending a terminal configuration for a terminal service chain to a terminal configuration service.

The plurality of virtual network functions may comprise one or both of: an encapsulator and a modulator that convert Ethernet packets to satellite frames; or a demodulator and decapsulator that convert satellite frames to Ethernet packets.

The method may further comprise: instantiating the satellite-network service chain in a sandbox environment, wherein the plurality of virtual network functions comprises one or more virtual network functions that simulate the satellite link; and acquiring performance parameters of the satellite-network service chain in the sandbox environment.

The method may further comprise reconfiguring the satellite-network service chain in the sandbox environment based on the acquired performance parameters.

The method may further comprise, by the SDN controller: receiving a service request comprising a service definition for a monitoring service; determining a configuration for a monitoring service chain for the monitoring service; and initiating instantiation of the monitoring service chain in the determined configuration, wherein the monitoring service chain performs analysis on a digital signal stream in the satellite-network service chain.

The plurality of virtual network functions may comprise a virtualized modem including at least one demodulator configured to demodulate waveforms according to a Digital Video Broadcasting (DVB) standard, at least one modulator configured to modulate waveforms according to the DVB standard, at least one encapsulator, and at least one decapsulator. The virtualized modem may provide Carrier Ethernet services.

Any of the methods above may be embodied, individually or in any combination, in executable software modules of a processor-based system or distributed processor-based systems, and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

In an embodiment, systems and methods are disclosed for the dynamic management of software-defined service chains for satellite communications in an automated and scalable manner. After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. Introduction

Embodiments utilize the concept of service orchestration to drive the automated creation of services that utilize satellite communications in a virtual (e.g., cloud) environment. Embodiments may dynamically adapt to the specifics of satellite RF environments by automatically adjusting services in response to changes in the characteristics of the satellite itself. These characteristics may include attributes of the beam or antenna, payload electronics (e.g., transponders, regenerative systems, on-board dividers, on-board combiners, steerable antennas, etc.), and/or any other attributes that are unique to the satcom domain. Such automation may account for factors that affect satellite RF links, such as high latency, rain or atmospheric fading, differing orbit dynamics (e.g., satellite handoff or inter-satellite communications links), changes in service traffic patterns (e.g., to optimize resources of the satellite payload), and/or the like.

In an embodiment, to address these satellite-specific factors, given the variability of configuration options and utilizing an OSS layer in the satcom domain, a method may comprise defining an end-to-end service in the OSS layer, communicating the initial (day-0) configuration to the underlying elements which constitute the service, instantiating the underlying elements into a service chain in the initial configuration within the cloud computing environment, bringing the service chain into a production (day-1) configuration, and shifting the service to new (day-N) configurations over the lifecycle of the service to satisfy the service level agreement and/or key performance indicators (KPIs) required by the service definition.

While embodiments are described herein, primarily, in the context of OSS, it should be understood that embodiments may be implemented for other types of systems. For example, the disclosed embodiments may be implemented for mission data download and processing, telemetry, tracking, and command (TT&C), data relay, and/or the like.

2. System Overview

Figure 1:
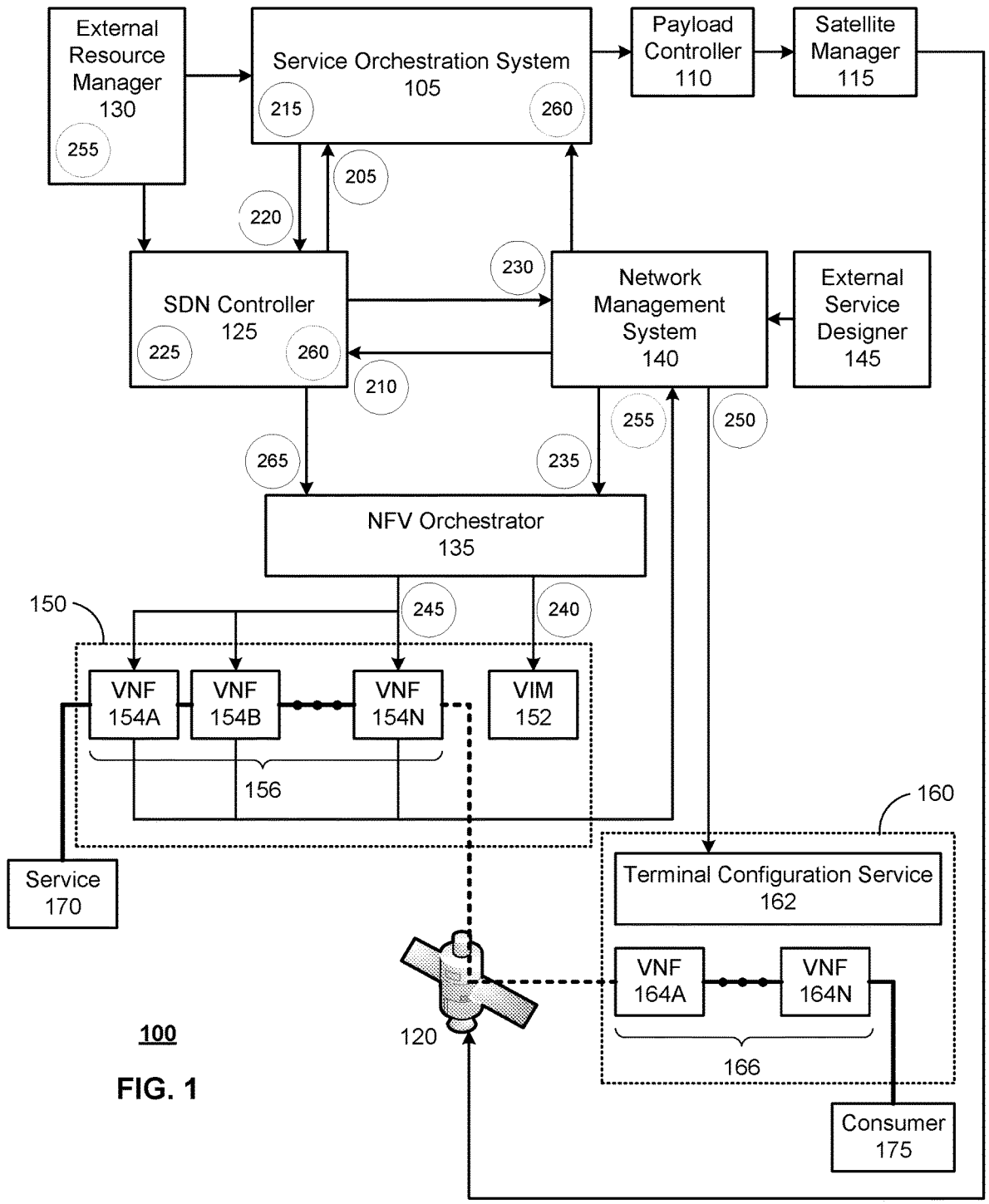
FIG. 1 illustrates an example infrastructure, in which one or more of the processes described herein, may be implemented, according to an embodiment.

FIG. 1 illustrates an example infrastructure 100, in which one or more of the processes described herein, may be implemented, according to an embodiment. Infrastructure 100 may comprise a service orchestration system 105, payload controller 110, satellite manager 115, satellite 120, software-defined network (SDN) controller 125, external resource manager 130, network functions virtualization (NFV) orchestrator 135, network management system (NMS) 140, external service designer 145, satellite NFV infrastructure 150 supporting at least one service 170, and edge NFV infrastructure 160 supporting at least one consumer 175. While only one of each component of infrastructure 100 is illustrated, it should be understood that infrastructure 100 may comprise any number of any of the components, including, for example, one or a plurality of service orchestration systems 105, payload controllers 110, satellite managers 115, satellites 120, SDN controllers 125, external resource managers 130, NFV orchestrators 135, network management systems 140, external service designers 145, satellite NFV infrastructures 150, edge NFV infrastructures 160, services 170, and/or consumers 175. It should be understood that communications between various components may be performed through one or more networks using standard and/or proprietary network communication protocols. Alternatively or additionally, some of the components may be hosted and/or executed in the same computing environment, in which case, they may communicate with each other via inter-process communications.

Service orchestration system 105 executes the operational and functional processes required for managing end-to-end services within a domain, including designing, creating, deploying, and terminating these services. Service orchestration system 105 manages services at the top of a satellite-communication (satcom) domain, and may communicate with one or more service orchestration systems that manage services for other domains, such as other satcom domains, telecommunication (telecom) domains, and/or other types of domains.

Service orchestration system 105 may communicate directly or indirectly with a payload controller 110. Payload controller 110 may map or otherwise translate instructions from service orchestration system 105 into procedures for a satellite manager 115. For example, the instructions may comprise configuration instructions for configuring a satellite 120. In turn, satellite manager 115, which may be a satellite command and control (C2) system, encodes these procedures into an RF link with satellite 120, according to the satellite's particular control standard. As one of many possible examples, satellite manager 115 may comprise the Automated Real-Time Execution Suite (ARES) of the EPOCH® Integrated Product Suite (IPS), offered by Kratos Defense & Security Solutions, Inc. of San Diego, California. Satellite 120 decodes the procedures from the RF link, and executes the procedures, which may comprise configuring one or more components in the payload of satellite 120 to support a service managed by service orchestration system 105. Thus, service orchestration system 105 may manage the payload of satellite 120 like any other network element to orchestrate and optimize operations.

Examples of methods implemented by payload controller 110 and/or satellite manager 115 to reconfigure a satellite payload based on a payload model are disclosed in International Patent Pub. No. PCT/US2021/037239, filed on Jun. 14, 2021, which is hereby incorporated herein by reference as if set forth in full. For example, payload controller 110 may be a software-defined payload controller with a REST configuration protocol (RESTCONF) interface. Service orchestration system 105 may provide the payload configuration for a satellite 120 to payload controller 110 via the RESTCONF interface as a payload model that is defined, for example, in the Yet Another Next Generation (YANG) data modeling language. Payload controller 110 may translate the payload model into one or more C2 procedures, and communicate those C2 procedures to satellite manager 115. For example, payload controller 110 may format the C2 procedures into extensible Markup Language (XML) and transmit the XML to the ARES/EPOCH interface using Transmission Control Protocol (TCP) or another communication protocol.

Service orchestration system 105 may communicate with one or a plurality of SDN controllers 125. Each SDN controller 125 consumes service requests from service orchestration system 105. For each service request, SDN controller 125 analyzes the service request and selects the appropriate service chains from a catalog of service chains which can be used to service the request. The service operator may build and configure the service chain catalog necessary to implement service requests through external service designer 145 or directly within network management system 140. In particular, SDN controller 125 may determine which catalog elements are required to implement the service chain and then instruct NFV orchestrator 135 as to which elements are required to build the service chain. SDN controller 125 may also terminate or tear down service chains, as well as update service chains into day-N configurations based, for example, on information provided by one or more external resource managers 130 and/or network management systems 140. SDN controller 125 may manage services chains through communications with one or a plurality of NFV orchestrators 135 and/or one or a plurality of network management systems 140. SDN controller 125 may be implemented in the OpenSpace™ platform provided by Kratos Defense & Security Solutions, Inc. of San Diego, California. In an embodiment, service orchestration system 105 may poll SDN controller 125 for the status of any service chain at any time, and SDN controller 125 may responsively provide the status of the service chain to service orchestration system 105.

Each external resource manager 130 may monitor parameters of service chains. For example, external resource manager 130 may be a resource controller that monitors parameters of an RF link to or from satellite 120, load parameters on a gateway, and/or other dynamic parameters related to a service chain. External resource manager 130 reports these parameters to either service orchestration system 105 and/or SDN controller 125 to inform decision-making (e.g., trigger actions) at service orchestration system 105 and/or SDN controller 125.

Each NFV orchestrator 135 may manage a satellite NFV infrastructure 150 on the service side of a satellite 120. NFV orchestrator may act as virtual network function (VNF) manager that communicates with a virtual infrastructure manager (VIM) 152 to instantiate one or more virtual network functions (VNFs) 154 representing a satellite service chain 156 within satellite NFV infrastructure 150. NFV orchestrator 135 may also configure each instantiated VNF 154. NFV orchestrator 135 may be implemented in the OpenSpace™ platform provided by Kratos Defense & Security Solutions, Inc. of San Diego, California.

Each network management system 140 maintains information about the network, including a service catalog, an inventory of service interface points (SIPs) within the network, attributes of components of the network (e.g., capabilities or classes of network elements), and/or the like. The service catalog may comprise a plurality of service profiles that each represents a configuration for a particular service chain. Each service profile may comprise a symbol rate of the carrier, a gateway that can support the service chain, a frequency, a beam, a spectral efficiency of the beam, RF power of the beam, gain/noise temperature (G/T) of the beam definition, a supported class of terminal (e.g., antenna size, amplifier size, output power, antenna gain, etc.), dimensions of computing resources, and/or the like. It should be understood that each service profile does not need to include all of the information used for a service chain, and that some of this information may be acquired from other systems (e.g., service orchestration system 105, external resource manager 130, etc.) as needed and/or otherwise derived, instead of stored in the service catalog. The service catalog may be indexed by one or more features of a service request and/or one or more parameters derivable from the service request, such that service profiles can be easily retrieved from the service catalog based on the service request. The inventory of service interface points may include an inventory of physical or virtual service termination points of a gateway and physical or virtual service termination points on remote terminals that are available within the network and managed by network management system 140.

Network management system 140 may communicate with NFV orchestrator 135 to instantiate and configure satellite service chain 156, and may collect statistics from each VNF 154 in satellite service chain 156 for reporting. Network management system 140 may also collect statistics about NFV infrastructure 150 from virtual infrastructure manager 152. In either case, the statistics may comprise key performance indicators (KPIs) and/or fault, configuration, accounting, performance, security (FCAPS) data. Network management system 140 may communicate with a terminal configuration service 162 in edge NFV infrastructure 160 to instantiate and configure the VNF(s) 164 that constitute terminal service chain 166.

Each satellite NFV infrastructure 150 may comprise a virtual infrastructure manager 152 configured to manage VNFs 154. In particular, virtual infrastructure manager 152 may instantiate a satellite service chain 156 comprising any number of VNFs 154, such as VNF 154A, VNF 154B, . . . , VNF 154N. It should be understood that serially connected VNFs 154 (e.g., VNFs 154 to 154N) in a given satellite service chain 156 may each perform a different function within that satellite service chain 156, and that different satellite service chains 156 may comprise the same or different sets of VNFs 154 as each other, depending on the services being supported by the respective satellite service chains 156. Satellite service chain 156 links service 170 to satellite 120. Satellite NFV infrastructure 150 may reside in a computing cloud, in which available resources are shared on-demand by a plurality of applications. This computing cloud may be co-located on the premises of the teleport facility, interconnected with an NFV infrastructure residing in a data center that provides private cloud computing, or residing in a public cloud computing environment (e.g., Microsoft Azure™). As one example, virtual infrastructure manager 152 and/or VNFs 154 may be implemented in the OpenSpace™ platform provided by Kratos Defense & Security Solutions, Inc. of San Diego, California.

Each edge NFV infrastructure 160 may comprise a terminal configuration service 162 configured to instantiate a terminal service chain 166. Terminal service chain 166 may comprise one or more VNFs 164, such as VNF 164A, . . . , VNF 164N. Terminal service chain 166 links consumer 175 to satellite 120. Edge NFV infrastructure 160 may reside in a private computing cloud that resides on a class of universal edge computing platforms. For example, edge NFV infrastructure 150 may be implemented in the OpenSpace Edge™ platform provided by Kratos Defense & Security Solutions, Inc. of San Diego, California.

An end-to-end service is formed between a service 170 and a consumer 175 of the service via satellite service chain 156, satellite 120, and terminal service chain 166. In other words, in one-way and two-way satellite communications, data flows from service 170 through satellite service chain 156, through satellite 120, and through terminal service chain 166, to consumer 175. It should be understood that in broadcast or multicast satellite communications, there may be a plurality of consumers 175. In addition, in two-way satellite communications, data flows from consumer 175, through terminal service chain 166, through satellite 120, and through satellite service chain 156, to service 170. In general, consumer 175 may be a device, such as an Internet router, Wi-Fi™ access device, computer, telephone, television, radio, and/or the like, and/or may be a software application comprised in such a device and/or in a cloud-computing environment.

3. Process Overview

Figure 2:
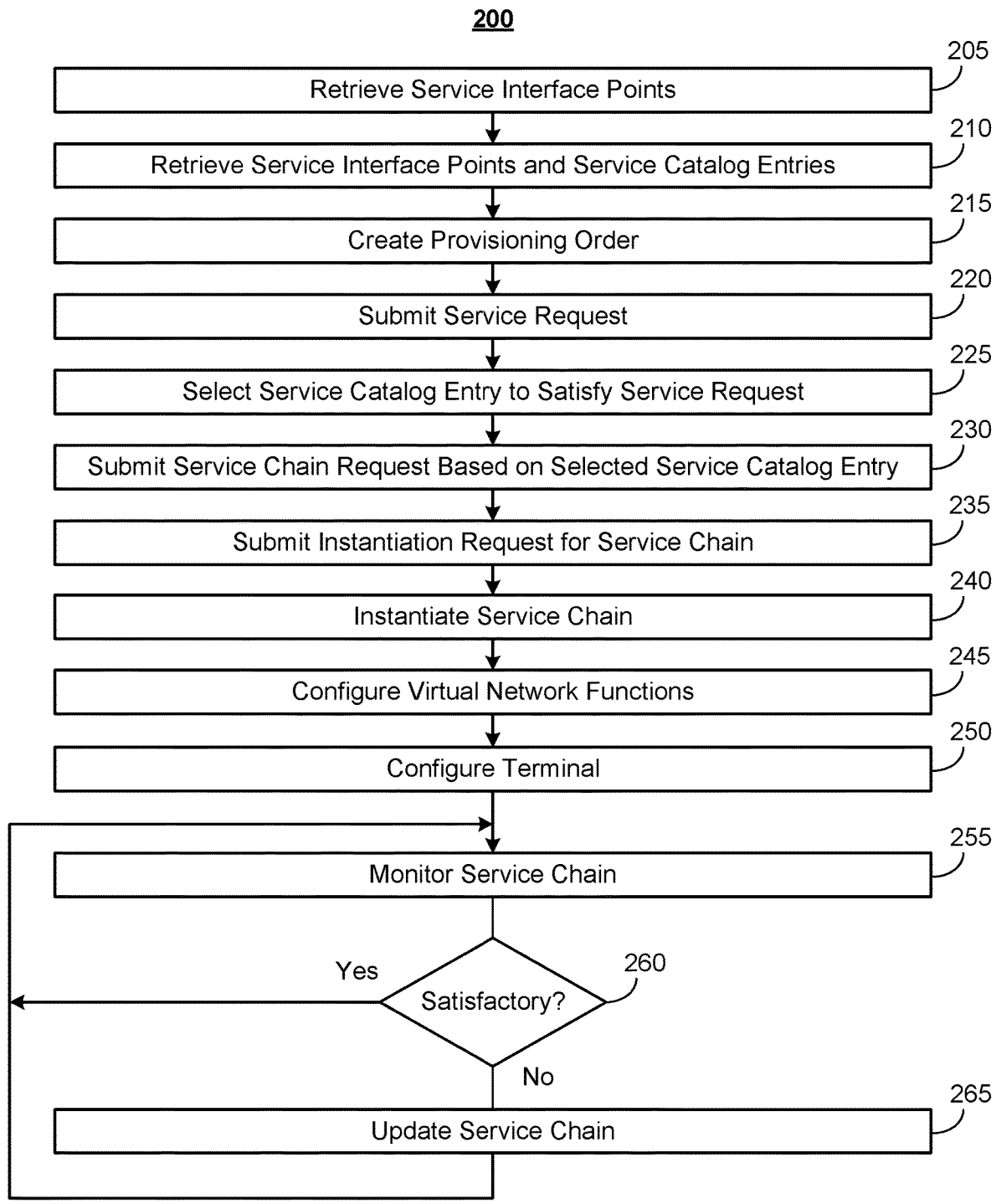
FIG. 2 illustrates a process for dynamic management of software-defined service chains for satellite communications, according to an embodiment.

FIG. 2 illustrates a process 200 for dynamic management of software-defined service chains for satellite communications, according to an embodiment. Process 200 may be embodied in one or more software modules, representing one or more of the components of infrastructure 100, that are executed by one or more hardware or virtual processors of one or more hardware systems. In particular, process 200 may be embodied in software modules that are distributed throughout infrastructure 100, as illustrated in an example by the corresponding subprocess numerals in FIG. 1.

While process 200 is depicted with a certain arrangement and ordering of subprocesses, process 200 may be implemented with fewer, more, or different subprocesses and a different arrangement and/or ordering of subprocesses. In addition, any subprocess, which does not depend on the completion of another subprocess, may be executed before, after, or in parallel with that other independent subprocess, even if the subprocesses are described or illustrated in a particular order.

In subprocess 205, service orchestration system 105 requests a list of available service interface points from SDN controller 125 or a plurality of SDN controllers 125 representing different physical or logical domains. For example, SDN controller 125 may implement an application programming interface (API). The API may conform to Representational State Transfer (REST). In an embodiment, the API of SDN controller 125 may utilize the Presto™ API of the Lifecycle Service Orchestration (LSO) reference architecture defined by the Metro Ethernet Forum (MEF). Thus, service orchestration system 105 may make a remote procedure call to a GET function of the API of SDN controller 125 to retrieve the list of available service interface points. Each service interface point represents a potential end point for an end-to-end service (e.g., on a gateway and/or edge).

In subprocess 210, SDN controller 125 retrieves the currently available service interface points and at least a portion of the service catalog. SDN controller 125 may retrieve these service interface points and service catalog from network management system 140. For example, network management system 140 may implement an API, such as the industry-standard OpenAPI™. Thus, SDN controller 125 may make a remote procedure call to a GET function of the API of network management system 140 to retrieve current service interface points and the current service catalog. Network management system 140 may respond with a list of service interface points that are defined as connectable service endpoints (e.g., gateway service interface points and terminal service interface points), and a list of service profiles from the service catalog that are production ready. Each service profile in the service catalog may be defined as a template file, such as the Network Service Descriptor (NSD) defined as part of the European Telecommunications Standards Institute (ETSI) Management and Orchestration (MANO) specification. Each service profile may define a day-0 and day-1 configuration for VNFs 154 of satellite service chain 156, in order to enable the corresponding service. Network management system 140 may also respond with attributes indicating the class (e.g., capabilities) of each service interface point that represents a terminal. These attributes may include, without limitation, type, size, link budget, and/or the like. SDN controller 125 may respond to the request, sent by service orchestration system 105 in subprocess 205, based on the response from network management system 140. This response may comprise the list of available service interface points.

In the illustrated embodiment, SDN controller 125 waits to receive a request from service orchestration system 105 before retrieving the current service interface points and service catalog from network management system 140. In an alternative embodiment, SDN controller 125 may periodically (e.g., according to a time interval) retrieve the service interface points and service catalog from network management system 140, and store them, such that SDN controller 125 may respond to service orchestration system 105 based on the most recently stored service interface points and service catalog, without necessarily having to first communicate with network management system 140. As another alternative, SDN controller 125 may itself store or have access to a database of service interface points and/or the service catalog.

In subprocess 215, service orchestration system 105 receives the response to its request from SDN controller 125, including the list of available service interface points, and creates a service request based on the response. Service orchestration system 105 may store the list of available service interface points, returned by SDN controller 125, to a database of possible endpoints that is used to define Carrier Ethernet (CE) services for customers. Service orchestration system 105 may also collect information on any existing CE Ethernet Virtual Connection (EVC) states. While the services described herein will primarily be described as CE services, it should be understood that the disclosed embodiments may be utilized for other types of services, such as other Layer-2 or Layer-3 TCP/IP services that express their service definitions as a combination of service interface points, maximum bit rates, and/or committed bit rates, single channel per carrier (SCPC) services, frequency-division multiple access (FDMA) network services, time-division multiple access (TDMA) network services, mission data download and processing, TT&C services, and/or the like.

Service orchestration system 105 may create a provisioning order (e.g., in the OSS layer) that associates two or more service interface points, service parameters, and/or transport attributes into a service definition (e.g., defining a CE service), based on the information in the response from SDN controller 125. In the case of a CE E-Line service, the service interface points may comprise or consist of a gateway and a terminal. In the case of a CE E-Tree or E-LAN service, the service interface points may comprise any plurality of service interface points. Examples of service parameters include, without limitation, a bitrate value (e.g., megabits per second (Mbps)) for maximum information rate (MIR), committed information rate (CIR), and/or excess information rate (EIR), and/or the like. These service parameters may represent a service level agreement. Examples of transport attributes include, without limitation, user-network interface or network-network interface, class of service, permitted virtual local area networks (VLANs), and/or other criteria.

In subprocess 220, service orchestration system 105 packages the service definition into a service request, and submits the service request to SDN controller 125 to activate the lifecycle of the requested service (e.g., CE service). For example, service orchestration system 105 may make a remote procedure call to a POST or PUT function of the API of SDN controller 125 to transmit the service request.

In subprocess 225, SDN controller 125 consumes the service request received from service orchestration system 105. In particular, SDN controller 125 calculates one or more parameters of a satellite link that satisfy the service definition, for example, based on the service interface points, service parameters, and/or transport attributes in the service definition. These parameter(s) may represent a link budget of the satellite link. SDN controller 125 determines which service profile(s) in the service catalog are able to satisfy the calculated parameter(s), serve the location of the terminal, and serve the class of the terminal (e.g., compatible with the capabilities or other parameters of the terminal). Determining the service profile(s) that can serve the location of the terminal may comprise determining which beam of satellite 120 (e.g., X, Y, Z, etc.) can serve the location of the terminal. Once SDN controller 125 determines the variables required to satisfy the service request, SDN controller 125 may store the service request as an EVC definition. If no service profiles in the service catalog are able to satisfy the service request, SDN controller 125 may respond to service orchestration system 105 with an indication that it cannot satisfy the service request.

In subprocess 230, SDN controller 125 submits a service chain request to network management system 140 to instantiate the appropriate satellite service chain 156. In particular, SDN controller 125 may select a service profile from the service catalog, generate a configuration based on the selected service profile, and package the configuration into a service chain request. SDN controller 125 may then make a remote procedure call to a PUT function of the API of network management system 140 to transmit the service chain request.

The configuration may be generated by extracting parameters from the service profile, and combining the extracted parameters together with other information that may be collected by SDN controller 125. The configuration may comprise the parameters of the service chain, including the specific VNFs and specific arrangement of VNFs to be used, the dimensions of the VNF service chain (e.g., satellite service chain 156 and/or terminal service chain 166), permissible cloud zones or regions, mode, the teleport uplink, the satellite assignment, and/or the like. The dimensions may include, without limitation, the number of virtual CPUs (vCPUs) to be provided to the service chain, the amount of memory to be provided to the service chain, disk storage to be provided to the service chain, network throughput to be provided to the service chain, and/or the like. The dimensions may be selected as one of a plurality of predefined performance tiers, based on service parameters in the service definition. The permissible cloud zones or regions may also be selected based on limitations in the service definition (e.g., specifying secure cloud, public cloud, or other enclave definitions).

In subprocess 235, network management system 140 submits an instantiation request for the requested service chain to NFV orchestrator 135. For example, NFV orchestrator 135 may implement an interface according to the MANO Os-Ma-Nfvo reference point. Thus, network management system 140 may transmit a Network Service Instantiate message for the desired satellite service chain 156 over this interface of NFV orchestrator 135. Satellite service chain 156 may be represented as a Network Service Descriptor within the Network Service Instantiate message. NFV orchestrator 135 may comprise a VNF manager, and network management system 140 may submit the day-1 configuration of satellite service chain 156, as defined in the instantiation request, to the VNF manager. In an alternative embodiment, SDN controller 125 may generate and submit the instantiation request for a service chain directly to NFV orchestrator 135, instead of using network management system 140 as an intermediary.

In subprocess 240, NFV orchestrator 135 instantiates satellite service chain 156. For example, the VNF manager of NFV orchestrator 135 may send a Life Cycle Management (LCM) Instantiate message to the appropriate virtual infrastructure manager 152 of the target satellite NFV infrastructure 150. Virtual infrastructure manager 152 consumes the message and instantiates the appropriate set of one or more virtual network functions 154 (e.g., VNF 154A to VNF 154N) that constitute satellite service chain 156. Once satellite service chain 156 is ready, virtual infrastructure manager 152 may transmit a message to NFV orchestrator 135 indicating that satellite service chain 156 is ready and/or including references to the VNFs 154 in satellite service chain 156. It should be understood that NFV orchestrator 135 may instantiate satellite service chain 156 according to the dimensions, in the cloud zones or regions, and/or in the mode (e.g., in a production environment or sandbox environment), specified in the configuration. It should be further understood that NFV orchestrator 135 may have or instantiate satellite service chains 156 with differing configurations based on the service requests, and that the only limit on the number of instances of satellite service chains 156 is the amount of resources available to satellite service chains 156 in satellite NFV infrastructure 150, as determined by the amount of resources in the cloud computing environment (e.g., within the specific cloud zone or region) and any other applicable constraints.

In subprocess 245, NFV orchestrator 135 configures each VNF 152 in satellite service chain 156. For example, once NFV orchestrator 135 receives the message from virtual infrastructure manager 152, indicating that satellite service chain 156 is ready, NFV orchestrator 135 may directly configure each VNF 154 in satellite service chain 156 (e.g., each of VNF 154A to VNF 154N).

In subprocess 250, network management system 140 uses the pairing of service interface points to generate the appropriate configuration for the terminal, and submits the generated configuration to terminal configuration service 162 of edge NFV infrastructure 160. Network management system 140 may submit the configuration to terminal configuration service 162 via one or more out-of-band channels. It should be understood that subprocess 250 may be performed before, in parallel with, or after any of subprocesses 235, 240, and 245. In an alternative embodiment, subprocess 350 may be performed by SDN controller 125.

In subprocess 255, network management system 140 monitors the lifecycle state of the entire service chain from service 170 to consumer 175. In particular, network management system 140 may collect statistics from each VNF 154 in satellite service chain 156 and/or each VNF 164 in terminal service chain 166. These statistics may be comprise key performance indicators and FCAPS data regarding the respective VNFs. Network management system 140 may provide these statistics to service orchestration system 105, SDN controller 125, and/or an external service management system in the OSS layer. For example, network management system 140 may make a remote procedure call to a PUT function of the API of service orchestration system 105, SDN controller 125, and/or external service management system to transmit the statistics.

Additionally or alternatively, in subprocess 255, one or a plurality of external resource managers 130 may monitor parameters representing the satellite link (e.g., payload changes), the load on satellite service chain 156 and/or terminal service chain 166 (e.g., for load balancing), and/or the like. Each external resource manager 130 may provide these parameters to service orchestration system 105, SDN controller 125, and/or an external service management system in the OSS layer. For example, external resource manager 130 may make a remote procedure call to a PUT function of the API of service orchestration system 105, SDN controller 125, and/or external service management system to transmit the parameters.

In subprocess 260, a decision-maker determines whether or not the current service chain is satisfactory based on the statistics provided by network management system 140 and/or the parameters provided by external resource manager(s) 130. The decision-maker may be service orchestrator 105, SDN controller 125, or an external service management system in the OSS layer, depending on the particular implementation. A service chain may be determined to be satisfactory if the statistics and/or parameters indicate that the service chain is satisfying a service level agreement and/or one or more key performance indicators associated with the service implemented by the service chain (e.g., defined by service parameters in the service definition). Conversely, a service chain may be determined to be unsatisfactory if the statistics and/or parameters indicate that the service chain is not satisfying (or significantly exceeding) the service level agreement and/or key performance indicator(s) associated with the service implemented by the service chain. The determination of whether or not a service chain is satisfying the associated service level agreement or key performance indicator(s) may be defined by whether or not the service chain is satisfying the bitrate value(s) of MIR, CIR, and/or EIR in the service request.

If the current service chain is determined to be satisfactory (i.e., "Yes" in subprocess 260), the service chain continues to be monitored in subprocess 255. Otherwise, if the current service chain is determined to be unsatisfactory (i.e., "No" in subprocess 260), the service chain is updated in subprocess 265. For example, if the decision-maker is service orchestration system 105, service orchestration system 105 may update the configuration of the service chain via one or more update messages to SDN controller 125. On the other hand, if SDN controller 125 is the decision-maker, SDN controller 125 may update the configuration of the service chain directly. In some cases, the decision-maker may depend on the problem, with some problems being managed by service orchestration system 105, other problems being managed directly by SDN controller 125, and/or other problems requiring input from an operator. In either case, SDN controller 125 may send one or more messages representing configuration change(s) to satellite service chain 156 to the VNF manager of NFV orchestrator 135. The VNF manager may then issue changes to all of the affected VNFs 154 in satellite service chain 156. Similarly, SDN controller 125 may send one or more messages representing configuration change(s) to terminal service chain 166 to network management system 140, and network management system 140 may then issues changes to all affected VNFs 164 in terminal service chain 166 via terminal configuration service 162. Alternatively, SDN controller 125 could send all configuration changes for both satellite service chain 156 and terminal service chain 166 to network management system 140, which may update the service chain similarly to how network management system 140 instantiated the service chain in subprocesses 235 and 250. It should be understood that the decision-maker may send configuration changes to a plurality of elements of satellite service chains 156 and/or terminal service chains 166 that were created by or subsequently designated to be under control of the decision-maker.

Thus, the service chain may be updated in real time to a day-N configuration, as changes occur in the monitored statistics and/or parameters, to ensure that the service chain always satisfies the service level agreement associated with the service. It should be understood that, as used herein, the term "real time" also refers to occurrences in near-real time, which may be delayed due to normal latencies in processing, network communications, and/or the like. In some instances, updating the service chain may comprise instantiating a new service chain, migrating traffic of the service from the old service chain to the new service chain, and terminating the old service chain after the traffic has been migrated.

In an embodiment, if a service chain cannot be updated in subprocess 265 to become satisfactory (e.g., satisfy the service level agreement or key performance indicator(s)), SDN controller 125 may return an error to service orchestration system 105. In this case, SDN controller 125 may also provide an error message to network management system 140 to indicate an unsatisfactory state, for the purposes of historical reporting and/or triggering an alarm to one or more recipients (e.g., other systems and/or a human operator). Alternatively, SDN controller 125 may autonomously update the service chain to a more acceptable configuration. A more acceptable configuration may be a configuration that brings the service chain closer to satisfactory (e.g., maximizes performance towards the associated service level agreement).

Subprocesses 255, 260, and 265 may be fully autonomous, such that no human intervention is required. In other words, service chains are automatically monitored and updated, as needed, in real time. Alternatively or additionally, subprocesses 255, 260, and 265 may be performed programmatically, for example, based on planned changes in service definitions in the OSS layer (e.g., by service orchestration system 105). In this case, the updates to service chains may be scheduled. In either case, process 200 enables fully automated deployment and scaling of service chain management in the satcom domain. Advantageously, the level of autonomy provided in infrastructure 100 can be tuned for each specific service provider's requirements, at any point along the spectrum between no autonomy and full autonomy.

4. Example Service Chain

Although a service chain is illustrated as a communication link between a service 170 and a consumer 175, a service chain may represent any meaningful communication link between two points. However, in contemplated embodiments, each service chain comprises a link through a satellite 120. In other words, each service chain may be a satellite-network service chain. As an alternative example, a service chain may provide communication with the satellite as an endpoint, for example, for TT&C, mission data download, and/or the like.

Figure 3A:
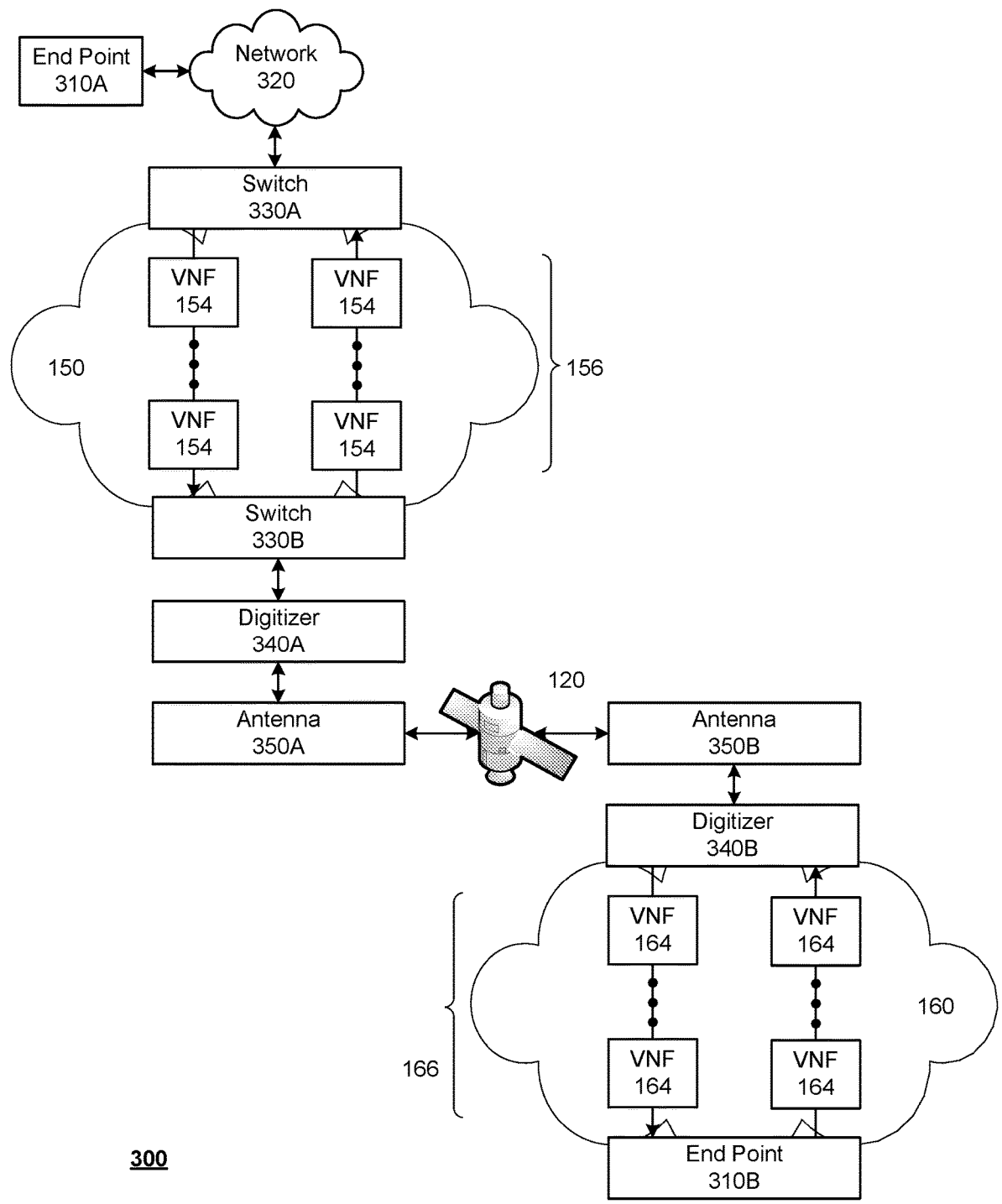
FIGS. 3A and 3B illustrate an example service chain for an end-to-end service, according to an embodiment.

FIG. 3A illustrates an example service chain 300 between an end point 310A and an end point 310B, according to an embodiment. For example, end point 310A may correspond to service 170, and end point 310B may correspond to consumer 175. However, it should be understood that a service chain 300 may comprise other end points 310 and/or other arrangements of components than those illustrated. Furthermore, multiple service chains 300 may be constructed and operate in parallel, and separate service chains 300 may have different arrangements from each other. In other words, service orchestration system 105 and/or SDN controller 125 may simultaneously manage a plurality of different and/or independent service chains 300.

In an embodiment, service orchestration system 105 may poll SDN controller 125 for the status of any service chain 300 at any time. Service orchestration system 105 may work in conjunction with SDN controller 125 to create, provision, administratively disable, or terminate service chains 300 based on service lifecycles defined for each service chain 300 in the OSS layer. At any time in the service lifecycle, SDN controller 125 will honor a request by service orchestration system 105 to change the lifecycle or state of a service by updating the corresponding service chain associated with that service. In the event that the request is to destroy a deployed service, SDN controller 125 may request NFV orchestrator 135 to terminate the service chain (e.g., satellite service chain 156) and release the underlying computing elements which were deployed when the service was created.

End point 310A may be communicatively connected via a network 320 (e.g., comprising the Internet or private telecom backbone) to one or a plurality of switches 330A of a gateway. Two sets of one or more VNFs 154 may provide two-way communication, including a transmission path and a reception path, between switch 330A and switch 330B of the gateway. It should be understood that in an example in which service chain 300 provides only one-way communication, VNFs 154 may provide only a transmission path without providing a reception path.

Switches 330A and 330B may each be physical or virtual Gigabit Ethernet (GigE) switches. Switch 330A and switch 330B are illustrated as separate switches, with switch 330A at the boundary between network 320 and satellite VNF infrastructure 150, and switch 330B at the boundary between satellite VNF infrastructure 150 and the components that provide the link to satellite 120. However, it should be understood that switches 330A and 330B could be implemented in the same switch. In any case, switch 330A may implement transport from network 320 to the User Network Interface (UNI) of a directly connected VNF 154 within satellite service chain 156, as defined by the applicable MEF E-Line or E-Access service standards. Alternatively, switch 330A may itself represent the UNI as defined by the applicable MEF E-Tree or E-LAN service standards.

Notably, from the perspective of end point 310A, end point 310A is simply communicating with a switch 330A. The fact that switch 330A provides communication through satellite 120 is inconsequential to end point 310A and does not need to be known by end point 310A. Thus, satellite communications can be utilized in the same manner as any other type of communication through network 320, thereby enabling the seamless integration of satellite communications into network 320. In essence, satellite 120 can be treated like any other switch within network 320.

The set of VNF(s) 154 (e.g., implementing a gateway) on the forward path from switch 330A to switch 330B, towards the link to satellite 120, may comprise or constitute, in order from switch 330A to switch 330B, a traffic handler, an encapsulator (e.g., implementing generic stream encapsulation (GSE)), a modulator (e.g., the OpenSpace™ Wideband Software modulator, offered by Kratos Defense & Security Solutions, Inc. of San Diego, California), and a combiner. This set of VNF(s) 154 on the transmission path may convert Ethernet packets to a digital signal. For example, the traffic handler may process data link layer (e.g., Layer 2 or L2 in the Open Systems Interconnection (OSI) model) and/or network layer (e.g., Layer 3 or L3 in the OSI model) traffic, and provide the processed Ethernet frames to the encapsulator. The encapsulator may convert the Ethernet frames into baseband frames, and provide the baseband frames to the modulator. The encapsulator may form baseband frames in accordance with the DVB-S2x standard, described in European Telecommunications Standards Institute (ETSI) European Standard (EN) 302 307-1 v1.4.1 (2014-11). The encapsulator may comprise one or more VNFs 154 (or software subprocesses) that perform one or more of the following functions: frame chopping; forward modulation selection (e.g., with Adaptive Coding and Modulation (ACM)); Ethernet bridge (e.g., Media Access Control (MAC) table, smart bridging/learning/relay, etc.); Address Resolution Protocol (ARP) (e.g., Ethernet MAC discovery), MEF service-delimiter type rewriting (e.g., to rewrite Ethernet frames on ingress/egress based on the MEF definition); over-the-air (OTA) transport header compression for Ethernet virtual connections (e.g., Robust Header Compression (ROHC)); and/or OTA optimization (e.g., Space Communications Protocol Specifications (SPCS)/TCP-Acceleration). The modulator may convert the baseband frames into signal data packets (e.g., according to the standards of the Digital Intermediate Frequency Interoperability (DIFI) Consortium in the DIFI/Institute of Electrical and Electronics Engineers (IEEE) 1.0 specification). In an embodiment, the encapsulator and the modulator may be implemented as a single VNF 154, referred to as a virtualized modem (vModem). The combiner may combine the signal data packets into a digital signal and provide the digital signal via switch 330B to a digitizer 340A, which will convert the digital signal into an analog signal.

The set of VNF(s) 154 on the return path from switch 330B to switch 330A, away from the link to satellite 120, may comprise or constitute, in order from switch 330B to switch 330A, a digital channelizer (e.g., the OpenSpace™ Wideband Channelizer, offered by Kratos Defense & Security Solutions, Inc. of San Diego, California), a demodulator (e.g., the OpenSpace™ Wideband Software Receiver, offered by Kratos Defense & Security Solutions, Inc. of San Diego, California) and a decapsulator. This set of VNF(s) 154 on the reception path may convert a digital signal to Ethernet packets. For example, the channelizer may receive a digital signal via switch 330B from digitizer 340A, which has converted an analog signal into the digital signal, and divide the digital signal into signal data packets. The demodulator may convert the signal data packets to baseband frames, and provide the baseband frames to the decapsulator. The decapulator may convert the baseband frames into Ethernet frames, which may be transmitted, via switch 330A and network 320, to end point 310A. It should be understood that the demodulator performs the reverse function(s) of the modulator, and the decapsulator performs the reverse function(s) of the encapsulator. In an embodiment, the decapsulator and demodulator may be implemented as a single VNF 154, for example, together with the encapsulator and modulator, in a vModem. In other words, a vModem may consist of a single VNF 154 that implements all of the functions of the encapsulator/decapsulator and modulator/demodulator.

In an embodiment, in which satellite service chain 156 implements a vModem, the vModem may comprise one or more modulators that are configured to modulate waveforms according to a digital satellite broadcast standard and/or one or more demodulators that are configured to demodulate waveforms according to the digital satellite broadcast standard. Such a vModem may provide CE service, in which case the vModem may comprise one or more encapsulators that convert Ethernet frames into baseband frames that are modulated into waveforms by the modulator(s), and one or more decapsulators that convert baseband frames, which have been demodulated from waveforms by the demodulator(s), into Ethernet frames. The digital satellite broadcast standard may be a digital satellite television broadcast standard, such as the DVB-S2X standard managed by the Digital Video Broadcasting (DVB) Project. While a digital satellite broadcast standard, such as a DVB standard, is used as an example, the vModem may be configured to modulate and demodulate waveforms according to other standards for wideband digital communication, such as orthogonal frequency-division multiplexing (OFDM) or the like.

Figure 3B:
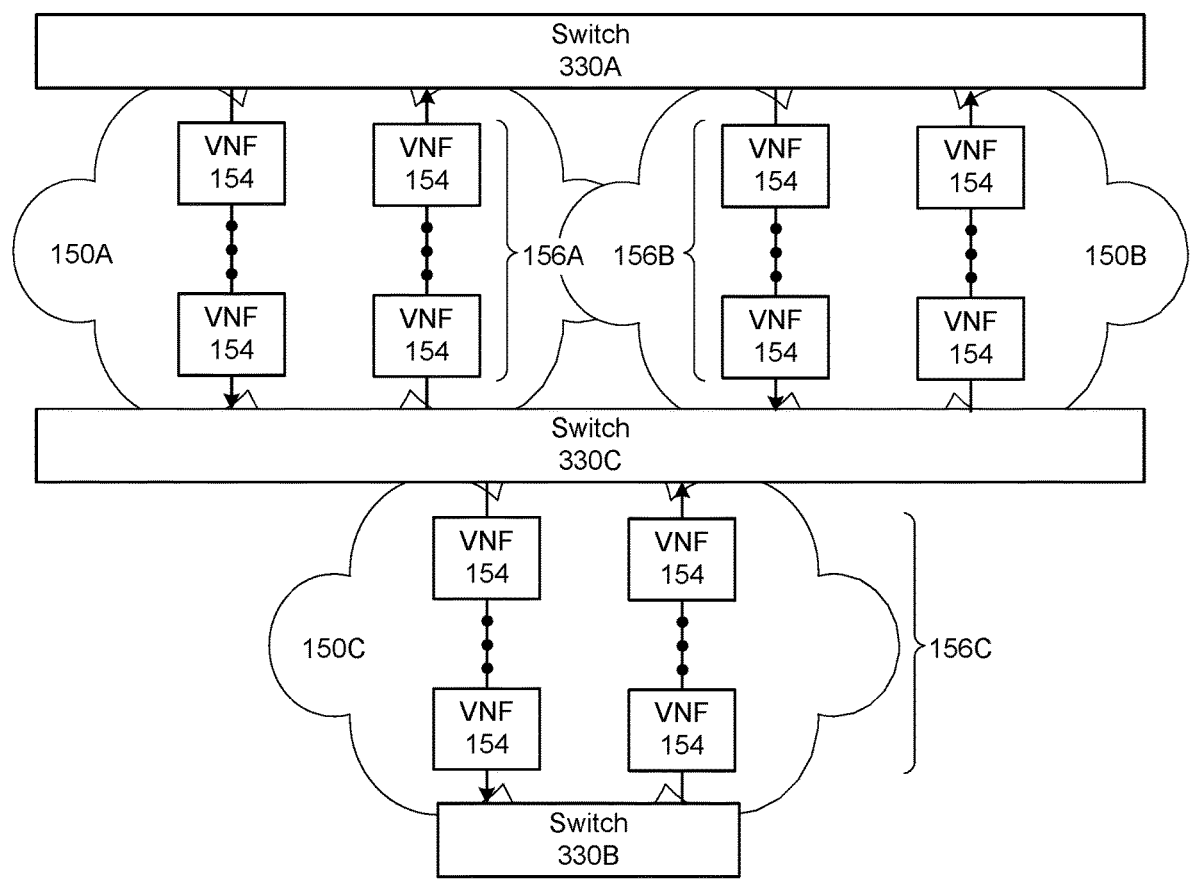

In an embodiment, satellite service chain 156 may be a composite service chain that utilizes two or more independently instantiated service chains. FIG. 3B illustrates an example of a composite service chain, according to an embodiment. In the illustrated example, a composite satellite service chain 156 is comprised of a first service chain 156A or 156B that is associated with a specific service 170 and a second service chain 156C that may be shared by a plurality of services. For example, both first service chain 156A and first service chain 156B may utilize second service chain 156. In this case, switch 330C may route data between service chains 156A and 156C, as well as between service chains 156B and 156C. First service chain 156A and 156B may represent different services or different instantiations of the same service. While only two are illustrated, it should be understood that any number of first service chains may be linked to second service chain 156C in the same manner. In an embodiment, second service chain 156C may have a longer lifecycle than any of the first service chains (e.g., 156A and 156B), such that second service chain 156C persists as numerous first service chains are instantiated, linked to second service chain 156C, and then terminated, based on the demand for one or more services 170. First service chains 156A and 156B may be instantiated in the same satellite NFV infrastructure 150 (i.e., 150A and 150B are the same) or different satellite NFV infrastructures 150 (i.e., 150A and 150B are different). Similarly, second service chain 156C may be instantiated in the same satellite NFV infrastructure 150 as one or more of the first service chains (i.e., 150C is the same as 150A and/or 150B) or a different satellite NFV infrastructure 150 than any of the first service chains (i.e., 150C is different than 150A and 150B).

In a particular implementation, first service chains 156A and 156B may each comprise a set of VNFs 154 that includes an encapsulator and modulator (e.g., the OpenSpace™ Wideband Transmitter, offered by Kratos Defense & Security Solutions, Inc. of San Diego, California) on the forward path and a demodulator and decapsulator on the return path, whereas second service chain 156C may comprise a digital combiner (e.g., the OpenSpace™ Wideband Combiner, offered by Kratos Defense & Security Solutions, Inc. of San Diego, California) on the forward path and a digital channelizer (e.g., the OpenSpace™ Wideband Channelizer, offered by Kratos Defense & Security Solutions, Inc. of San Diego, California) on the return path. In this implementation, second service chain 156C may only have a single VNF 154 on each of the forward and return paths, and persist over the lifecycles of multiple first service chains.

Switch 330B communicates with a software-defined digitizer 340A. In particular, switch 330B transmits the digital signal from the combiner in satellite service chain 156 to digitizer 340A, and, in two-way communications, relays the digital signal from digitizer 340A to the channelizer in satellite service chain 156. Digitizer 340A converts the digital signal, output by the combiner of satellite service chain 156, into an analog transmission signal for communication to satellite 120, and digitizes analog reception signals from satellite 120 into digital signals for use by the channnlizer of satellite service chain 156. Digitizer 340A may be software-defined. As one example, digitizer 340A may be a SpectralNet™, which is a carrier-grade RF digitizer, offered by Kratos Defense & Security Solutions, Inc. of San Diego, California.

Digitizer 340A communicates with antenna 350A. In particular, digitizer 340A provides the transmission signal to antenna 350A, which transmits the transmission signal to satellite 120. In addition, in two-way communications, antenna 350A receives a reception signal from satellite 120, and provides the reception signal to digitizer 340A.

Satellite 120 relays signals from antenna 350A to antenna 350B. In two-way communications, satellite 120 also relays signals from antenna 350B to antenna 350A. Antenna 350B may be functionally similar or identical to antenna 350A, and therefore, any description of antenna 350A applies equally to antenna 350B, which will not be redundantly described herein. Similarly, digitizer 340B may be functionally similar or identical to digitizer 340A, and therefore, any description of digitizer 340A applies equally to digitizer 340B, which will not be redundantly described herein.

Digitizer 340B may communicate directly with terminal service chain 166 of edge VNF infrastructure 160. Terminal service chain 166 may comprise a set of VNF(s) 164 forming a reception path from signal processor 340B to end point 310B. In two-way communications, terminal service chain 166 may also comprise a set of VNF(s) 164 forming a transmission path from end point 310B to digitizer 340B. The reception and transmission paths may be identical or similar to the reception and transmission paths described with respect to satellite service chain 156. For example, the reception path may comprise a demodulator followed by a decapsulator to convert signal frames into Ethernet packets, and the transmission path may comprise an encapsulator followed by a modulator to convert Ethernet packets into signal frames. The encapslator, decapsulator, modulator, and demodulator may all be similar or identical to those described with respect to satellite service chain 156, and therefore, the descriptions of those components with respect to satellite service chain 156 apply equally to those components in terminal service chain 166, which will not be redundantly described herein.

Terminal service chain 166 may communicate with end point 310B. For example, the decapsulator of terminal service chain 166 may transmit Ethernet packets to end point 310B. In addition, in two-way communications, the encapsulator of terminal service chain 166 may receive Ethernet packets from end point 310B. Thus, service chain 300 enables one-way or two-way communications between end points 310A and 310B over a satellite link.

It should be understood that service chain 300 is a single, non-limiting example of a service chain. In an alternative example, the terminal side of satellite 120 could be identical to the gateway side of satellite 120 illustrated in FIGS. 3A and 3B, such that digitizer 340B communicates with a switch 330B, which relays data between digitizer 340B and terminal service chain 166, and terminal service chain 166 communicates with end point 310B via a switch 330A on a network 320. In another alternative example, the gateway side of satellite 120 could be identical to the terminal side of satellite 120 illustrated in FIGS. 3A and 3B, such that satellite service chain 156 communicates directly with digitizer 340A and end point 310A, instead of via switches 330 and/or network 320. Service chains may also be configured in any number of other various manners.

Service chain 300 may comprise one or more of the software-defined components (e.g., VNFs and/or digitizer) described in International Patent App. Nos. PCT/US2021/033867, filed on May 24, 2021, PCT/US2021/033875, filed on May 24, 2021, PCT/US2021/033905, filed on May 24, 2021, and PCT/US2021/062689, filed on Dec. 9, 2021, which are all hereby incorporated herein by reference as if set forth in full.

Advantageously, the utilization of VNFs and software-defined components (e.g., digitizers 340A and 340B) to perform various functions of service chain 300, aid in automation and scalability. In particular, service chain 300 minimizes the presence of physical hardware components, such that components of service chain 300 can be dynamically reconfigured (e.g., added, updated, destroyed, increased or decreased in dimension, etc.) in real time, primarily using in-band network communications, to adapt to the unique multivariate satcom environment (e.g., RF interference, atmospheric characteristics, antenna conditions, path length, etc.).

Notably, dynamic reconfiguration of VNFs in a cloud computing environment can be used, not only to increase the dimensions of the computing resources (e.g., number of vCPUs, amount of memory and/or disk storage, network throughput, etc.) used for service chain 300 on demand to ensure the sufficiency of service chain 300, but also to decrease the dimensions of the computing resources on demand to optimize the utilization of the hardware. For example, favorable changes in the satcom environment may improve performance of service chain 300, such that service chain 300 is providing significantly better performance than is required by the service level agreement. In this case, SDN controller 125 may determine that service chain 300 is unsatisfactory (e.g., in subprocess 260), and update service chain 300 (e.g., in subprocess 265) to reduce the resources used in service chain 300 (e.g., by reducing RF bandwidth usage, resizing one or more VNFs, swapping to a service chain 300 with reduced dimensions, etc.). This is contrast to conventional hardware-based service chains in which unused resources would simply be idled or otherwise ignored, representing a sunk cost that cannot be recouped.

5. Sandbox

In an embodiment, an entire service chain (e.g., service chain 300) may be created in a virtual sandbox environment for testing or evaluation. For example, an operator of a service may desire to specifically tune the service prior to deployment. In this case, the operator may interact with service orchestration system 105, via a graphical user interface provided by network management system 140 or another system that interfaces with a web service of network management system 140, to construct a service chain in a sandbox environment. As used herein, the term "sandbox" refers to a testing environment that isolates the service chain from a production environment so that it can be safely evaluated without affecting any components of the production environment.

The construction of a service chain in a sandbox environment may be similar to the construction of a service chain in the production environment. In particular, service orchestration system 105 may send a service request to SDN controller 125, as in subprocess 220. This service request may comprise a mode that indicates that the service should be constructed in a sandbox environment. In response to the service request with the sandbox indication, SDN controller 125 may define a day-0 configuration for a service chain based on the service requirements. This day-0 configuration may include parameters of the satellite and RF link, so that VNFs representing the satellite and RF link can be defined. SDN controller 125 may submit an instantiation request to NFV orchestrator 135 to instantiate the entire service chain in the day-0 configuration within a sandbox environment. In response to the instantiation request, NFV orchestrator 135 may instantiate the service chain, according to the day-0 configuration, in a sandbox environment. For example, the entirety of the sandbox environment, including service chains 156 and 166, may be instantiated in a computing cloud. This service chain may be constructed using a plurality of VNFs, including, for example, VNFs 154 in satellite service chain 156 and VNFs 164 in terminal service chain 166. Hardware components, including those representing functions of satellite 120, may be represented by suitable VNFs that simulate the functions of the hardware components (e.g., according to parameters of the satellite and RF link in the day-0 configuration).

Figure 4:
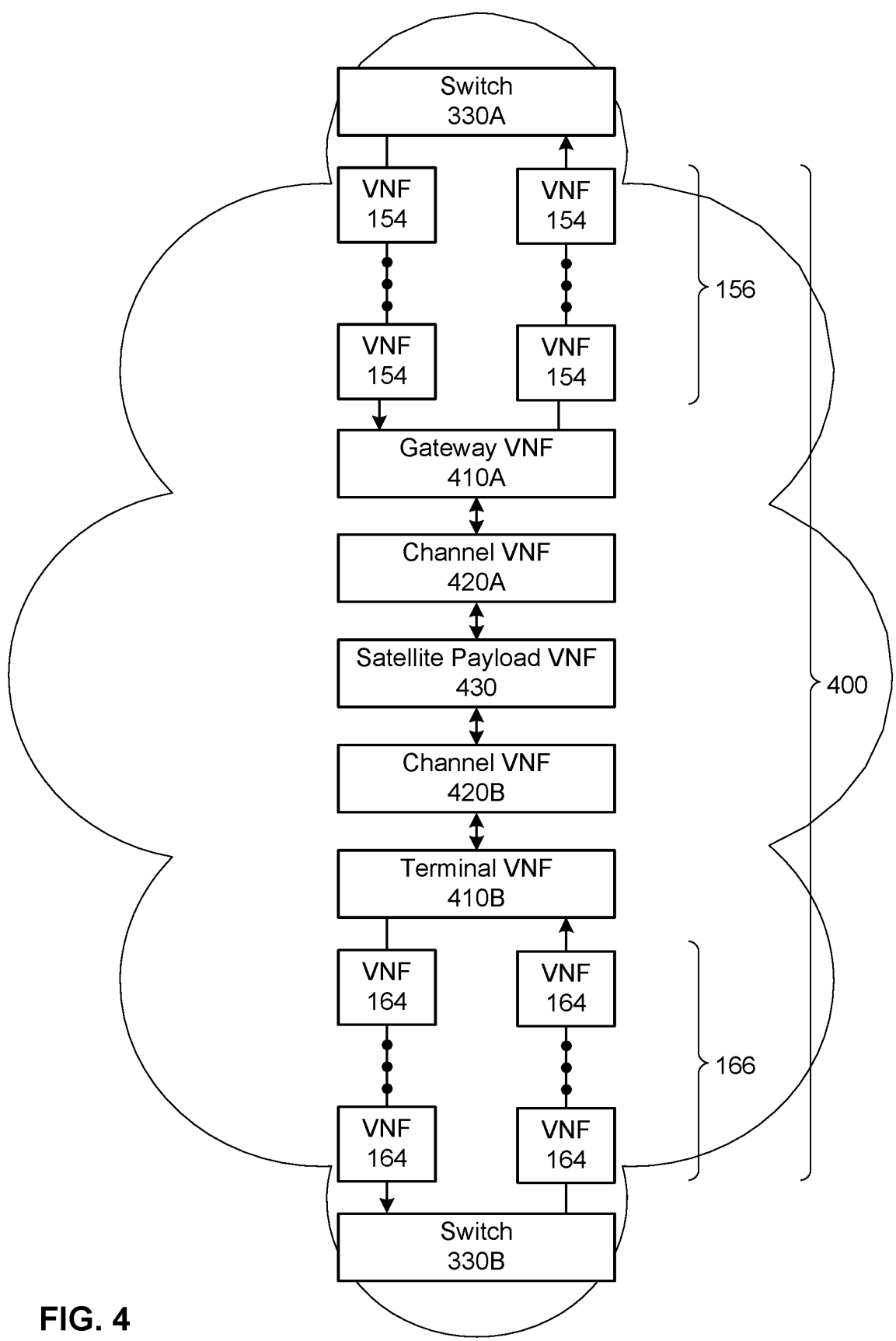
FIG. 4 illustrates an example service chain within a sandbox environment, according to an embodiment.

FIG. 4 illustrates an example service chain 400 within a sandbox environment, according to an embodiment. Service chain 400 may be accessible on the gateway end via switch 330A, and accessible on the terminal end via switch 330B. Switches 330A and 330B may each be Gigabit Ethernet (GigE) switches. While switches 330A and 330B are illustrated as separate switches, it should be understood that switches 330A and 330B could be implemented in the same physical or virtual switch. An operator can test or evaluate service chain 400 by executing a simulation that passes data through service chain 400 between switch 330A and switch 330B, according to a link budget and/or traffic characteristics of the scenario in which service chain 400 is to be evaluated. For example, the scenario may represent normal operation of service chain 400 within a production environment, with a specified link budget and traffic characteristics representing normal levels and variations in traffic over time. Performance parameters of the simulated service chain 400 may be acquired and analyzed to evaluate the expected performance of service chain 400 under the given scenario.

Satellite service chain 156 and terminal service chain 166 may be constructed in the same manner as described elsewhere herein. In other words, the same sets of VNF(s) 154 and 164 may be used to construct these portions of service chain 400. The primary difference between sandboxed service chain 400 and production service chain is that physical components, such as antenna 350 and satellite 120, can be replaced with VNFs that model those physical components. However, this is not a requirement of any embodiment, since the set of VNF(s) 154 and/or 164 may be tested in the sandbox environment with or without modeling the physical components.

Gateway VNF 410A and terminal VNF 410B may model the RF attributes of the gateway and terminal, respectively. For example, terminal VNF 410B may simulate a very-small-aperture (VSAT) ground station, assuming the terminal in the production environment is intended to be a VSAT ground station. The RF attributes may include, without limitation: antenna attributes, such as gain and G/T profile, pointing error, feed list, polarization, frequency antenna schedules (pointing), and/or the like; amplifier attributes, such as power response (Input Back Off/Output Back Off (IBO/OBO)), amplitude modulation (AM)/AM characteristics, AM/phase modulation (PM) characteristics, and/or the like; frequency converter attributes, such as attenuation, non-linearities, and/or the like; channelizer attributes, such as gain and/or the like; and/or the like. In addition, gateway VNF 410A and terminal VNF 410B may model the location of the respective ground stations, including any regulatory constraints corresponding to those locations.

Channel VNF 420A and 420B may model the RF link with satellite 120. The modeled attributes of the RF link may include, without limitation, free-space path loss, atmospheric loss, rain-fade, availability, and/or the like.

Satellite payload VNF 450 may model satellite 120, including the name and location of satellite 120 and attributes of its payload. The modeled attributes of the payload may include, without limitation: beam attributes, such as direction (e.g., up or down), type (e.g., effective or equivalent isotropic radiated power (EIRP), G/T, saturated flux density (SFD), etc.), polarization, frequency band, coverage charts, and/or the like; transponder attributes, such as start and stop frequencies (bandwidth), frequency offset, power response (IBO/OBO), AM/AM characteristics, AM/PM characteristics, and/or the like; transponder schedules, such as mode (e.g., Automatic Level Control (ALC), Fixed Gain Mode (FGM), Standby, Off, etc.), attenuation, level, aggregate power, and/or the like; beam-transponder schedule, such as connectivity, beam location, and/or the like; and/or the like. Notably, satellite payload VNF 140 and/or channel VNFs 420A and 420B may be configured to model various characteristics of the satellite link, including, without limitation, co-pol interference, adjacent beam interference, cross-pol interference, power equivalent bandwidth (PEB), channel effects (e.g., multi-channel and/or multi-signal effects), and/or the like.

In an embodiment, SDN controller 125 may provide a configuration interface (e.g., the API of SDN controller 125) that enables the operator to adjust the parameters of the day-0 configuration, so that service chain 400 may be adjusted based on the performance of service chain 400 during simulations. Thus, the operator may fine-tune a service chain in the sandbox environment prior to deployment in a production environment. In addition, just like any other service chain 300, service orchestration system 105 may poll SDN controller 125 for the status of service chain 400 at any time. The operator may manually, and/or service orchestration system 105 may automatically, measure and optimize various settings of service chain 400, including, without limitation, gateway settings, terminal settings, channel settings, satellite settings, network throughput, link throughput, and/or the like, during simulation in the sandbox environment.

Once an operator is satisfied with the performance of service chain 400, the operator may store a configuration of the service chain, based on service chain 400, as a service profile in the service catalog. The service profile may comprise the day-1 configuration of the service chain. Subsequently, the service chain may be deployed from the service catalog by service orchestration system 105, via SDN controller 125, at any time. Alternatively or additionally, in an embodiment, the operator may deploy the service chain directly from the sandbox environment to the production environment (e.g., via the configuration interface of SDN controller 125).

Advantageously, deployment of a service chain 400 from a sandbox environment to the production environment may be identical to the deployment of a service chain 300 directly to the production environment. Thus, utilization of the sandbox environment not only enables testing and tuning of the service chain, but also enables testing and tuning of deployment of the service chain. In particular, problems during deployment of a service chain from the sandbox environment to the production environment can be fixed so that they do not occur when the service chain is deployed directly to the production environment. Notably, this is not possible in a conventional environment that utilizes purpose-built hardware.

Figure 5:
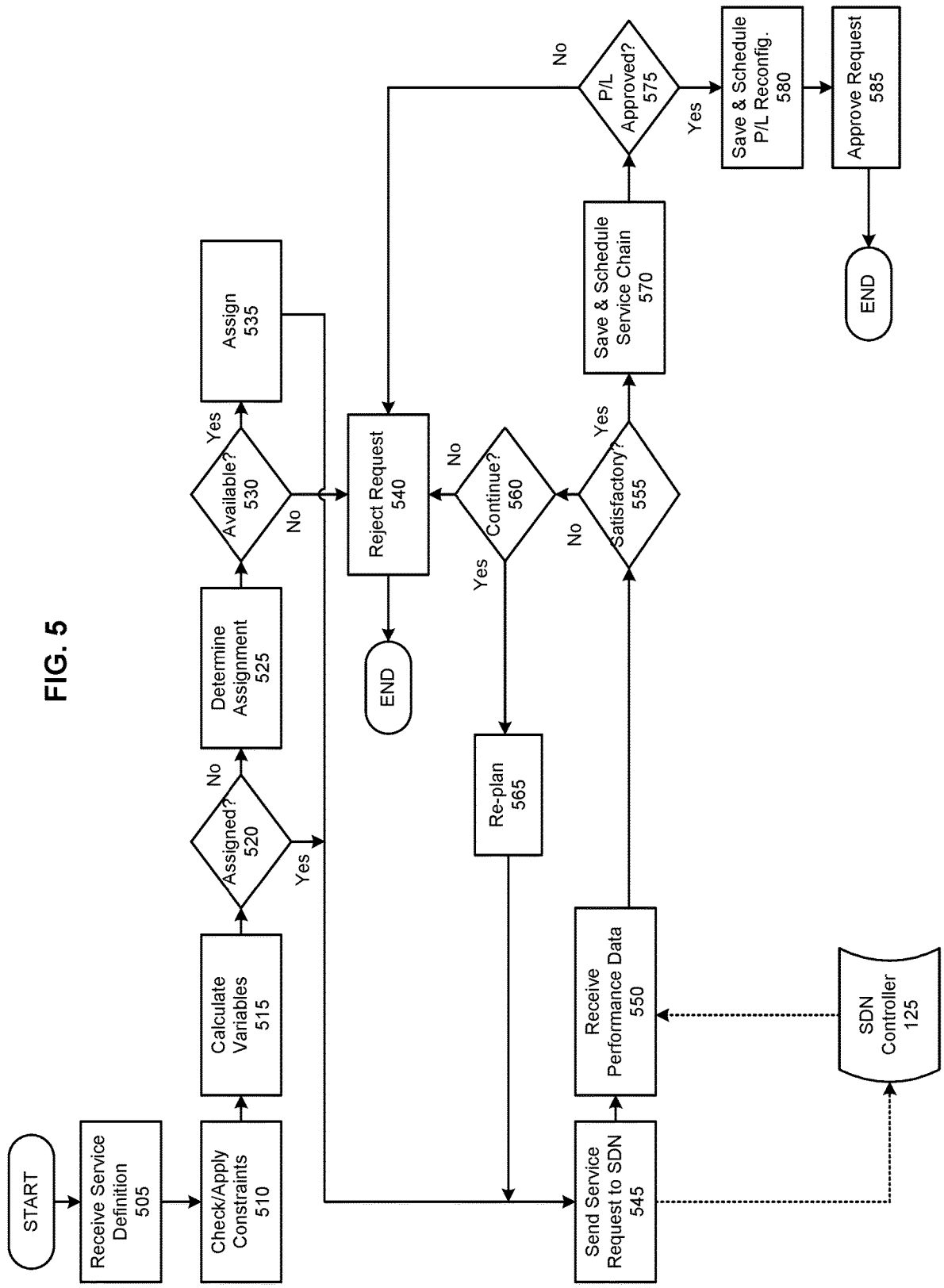
FIG. 5 illustrates a process for satellite planning using a sandbox environment, according to an embodiment.

FIG. 5 illustrates a process 500 for satellite planning using a sandbox environment, according to an embodiment. Process 500 may be embodied in one or more software modules representing external service designer 145 and/or service orchestration system 105. Essentially, process 500 receives and calculates parameters to configure a service chain, executes simulations in the sandbox environment to finalize the configuration of the service chain, and saves and/or schedules the service chain.

While process 500 is depicted with a certain arrangement and ordering of subprocesses, process 500 may be implemented with fewer, more, or different subprocesses and a different arrangement and/or ordering of subprocesses. In addition, any subprocess, which does not depend on the completion of another subprocess, may be executed before, after, or in parallel with that other independent subprocess, even if the subprocesses are described or illustrated in a particular order.

In subprocess 505, process 500 receives a service definition that defines a service. The service definition may be received from an operator (e.g., manually inputting the service definition into a graphical user interface), another system (e.g., via an API), and/or an internal process (e.g., in response to an event). The service definition may comprise the required bitrate values for MIR, CIR, and/or EIR, representing the service level agreement, the class of the terminal, the location of the terminal, the schedule of operation of the service, and/or the like.

In subprocess 510, process 500 checks and applies regulatory constraints. These regulatory constraints may be based on the location of the terminal in the service definition. For example, a regulatory model may be retrieved from a database of regulatory models, based on the location of the terminal, and a set of one or more constraints may be derived from the retrieved regulatory model.

In subprocess 515, process 500 calculates variables that apply to the service. These calculations may be constrained by the regulatory constraints applied in subprocess 510. The calculated variables may comprise variables that represent the ground stations (e.g., in gateway VNF 410A and terminal VNF 410B), RF links (e.g., in channel VNFs 420A and 420B), satellite payload (e.g., in satellite payload VNF 430), margin requirements, the link budget, and/or the like.

In subprocess 520, process 500 determines whether or not a satellite 120 and/or satellite bandwidth needs to be assigned to the service. When an existing service is being updated, there may be an existing bandwidth (e.g., frequency) assignment. If no more or no less bandwidth is required, the determination may be that no bandwidth needs to be assigned to the service. Otherwise, if there is no existing service or if more or less bandwidth is required for an existing service, the determination may be that bandwidth needs to be assigned to the service. If an assignment is needed (i.e., "No" in subprocess 520), process 500 proceeds to subprocess 525. Otherwise, if no assignment is needed (i.e., "Yes" in subprocess 520), process 500 proceeds to subprocess 545.

In subprocess 525, process 500 determines an assignment of satellite 120 and/or satellite bandwidth for the service. Subprocess 525 may comprise determining if there are sufficient satellite frequencies available on satellite 120 for the bandwidth needed by the service, and, if not, determining whether or not satellite 120 can be reconfigured to create the bandwidth needed by the service. A carrier assignments database may be consulted to identify an optimal assignment of bandwidth and power on a satellite 120, if any. The optimization may be performed on bandwidth and/or power, according to generic or customer-specific constraints.

In subprocess 530, process 500 determines whether or not an assignment was determined in subprocess 525. If an assignment is available (i.e., "Yes" in subprocess 530), the satellite, bandwidth, and power, determined in subprocess 525, are assigned to the service in subprocess 535. Otherwise, if no assignment is available (i.e., "No" in subprocess 530), process 500 may reject the request in subprocess 540.

Subprocess 540 may comprise notifying the requestor from which the service definition was received in subprocess 505. If the requestor was an operator, the notification may be provided via the graphical user interface and/or other communication means. If the requestor was another system or an internal process, the notification may comprise providing a response message to the other system or internal process.

In subprocess 545, process 500 sends a service request to instantiate and execute the service in the sandbox environment to SDN controller 125. The service request may comprise a configuration that includes the end-to-end link data necessary to model the service and an indication that the service should be simulated in the sandbox environment. The service request may be generated based on an applicable template in a database of service templates.

In subprocess 550, process 500 receives performance data acquired during simulation of the service in the sandbox environment. In particular, SDN controller 125 may instantiate and execute a service chain, representing simulation of the service, in the sandbox environment, as described elsewhere herein. SDN controller 125 may then collect performance data based on the simulation and return the performance data to process 500.

In subprocess 555, process 500 determines whether or not the performance data indicates that the service chain is satisfactory. For example, the service chain may be determined to be satisfactory if the performance data satisfies the service level agreement represented in the service definition. If the service chain is not satisfactory (i.e., "No" in subprocess 555), process 500 proceeds to subprocess 560. Otherwise, if the service chain is satisfactory (i.e., "Yes" in subprocess 555), process 500 proceeds to subprocess 570.

In subprocess 560, process 500 determines whether or not to perform re-planning of the service chain. The re-planning may be performed iteratively until either a satisfactory configuration is identified in subprocess 555 or a stopping condition is satisfied. In an embodiment, the stopping condition may be a threshold number of iterations. For example, if the number of iterations have not yet reached or exceeded the threshold, subprocess 560 may determine to continue with another iteration of re-planning. On the other hand, if the number of reaches has reached or exceeded the threshold, subprocess 560 may determine not to continue with another iteration of re-planning. If it is determined to continue with another iteration of re-planning (i.e., "Yes" in subprocess 560), process 500 may proceed to subprocess 565. Otherwise, if it is determined not to continue with another iteration of re-planning (i.e., "No" in subprocess 560), process 500 may reject the request in subprocess 540.

In subprocess 565, re-planning is performed. Re-planning may comprise reconfiguring the ground stations and/or satellite payload by adjusting one or more parameters. Examples of adjustable parameters include, without limitation, rain and SLA margin, gateway options, trade-offs of terminal cost and performance, satellite configuration, trade-offs between power and bandwidth, ACM, uplink power control, and/or the like. Subprocess 565 may utilize a database of predefined payload configurations (e.g., defined in YANG) during re-planning. In at least some iterations, re-planning may also include performance of subprocess 525 to determine a new assignment of satellite, bandwidth, and/or power. Subprocess 565 may have a manual mode (e.g., in which an operator adjusts parameter(s)) and an automatic mode (e.g., in which parameter(s) are automatically adjusted). Once a new configuration is generated, process 500 may return to subprocess 545 to reconfigure the service chain via SDN controller 125, as well as collect performance data for the reconfigured service chain in subprocess 550.

In subprocess 570, process 500 may save the service chain, which has been determined as satisfactory in subprocess 555, as a service profile in the service catalog described elsewhere herein. In addition, the service chain may be scheduled for deployment according to the schedule of operation in the service definition.

In subprocess 575, process 500 may request approval for the payload configuration in the service chain, which has been determined as satisfactory in subprocess 555. The approval request may be made to an operator (e.g., via the graphical user interface), another system (e.g., via an API of the system), and/or another internal process. If approval is received (i.e., "Yes" in subprocess 575), process 500 may proceed to subprocess 580 and then approve the request, initiated in subprocess 505, in subprocess 585. Otherwise, if approval is not received or disapproval is received ("No" in subprocess 575), process 500 may reject the request in subprocess 540.

In subprocess 580, process 500 may save the payload configuration in the service chain. In addition, the reconfiguration of the payload of satellite 120 may be scheduled according to the schedule of operation in the service definition. According to the schedule of operation, the payload of satellite 120 will be reconfigured (e.g., via communication between service orchestration system 105 and payload controller 110), and the service chain, saved in subprocess 570, will be instantiated and executed in a production environment, rather than in the sandbox environment.

6. Payload Orchestration

Figure 6:
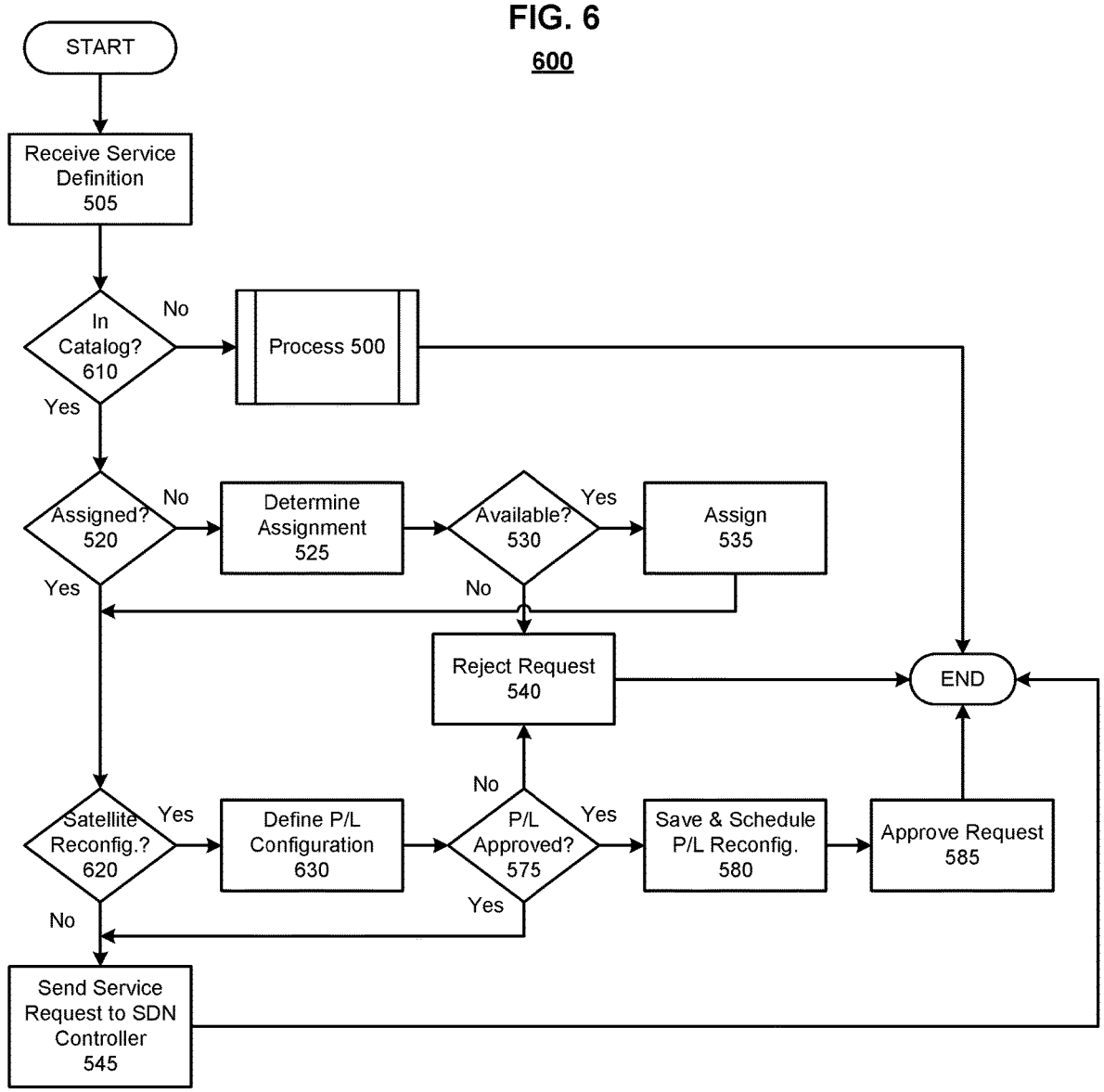
FIG. 6 illustrates a process for automated management of satellite resources, according to an embodiment.

FIG. 6 illustrates a process 600 for automated management of satellite resources, according to an embodiment. Process 600 may be embodied in one or more software modules representing service orchestration system 105. Essentially, process 500 determines whether a service is achievable, available, and supportable, and reconfigures the payload of satellite 120, if necessary.

While process 600 is depicted with a certain arrangement and ordering of subprocesses, process 600 may be implemented with fewer, more, or different subprocesses and a different arrangement and/or ordering of subprocesses. In addition, any subprocess, which does not depend on the completion of another subprocess, may be executed before, after, or in parallel with that other independent subprocess, even if the subprocesses are described or illustrated in a particular order.

In the illustrated embodiment, process 600 reuses many of the subprocesses described with respect to process 500. Thus, where a subprocess from process 500 is repeated in process 600, it will not be redundantly described. Rather, it should be understood that any description of that subprocess with respect to process 500 may apply equally to that subprocess in process 600.

In subprocess 505, a service definition is received. Firstly, in subprocess 610, process 600 determines whether or not a satisfactory service profile is in the service catalog. Subprocess 610 may be performed in consultation with SDN controller 125. For example, service orchestration system 105 may communicate with SDN controller 125, as described elsewhere herein, to determine whether a suitable service chain is already available in the service catalog. If a satisfactory service profile exists in the service catalog (i.e., "Yes" in subprocess 610), process 600 may proceed to subprocess 520. Otherwise, if no satisfactory service profile exists in the service catalog (i.e., "No" in subprocess 610), process 600 may perform the entirety of process 500 to potentially define a new service profile that is added to the service catalog and scheduled for deployment as a service chain.

In subprocess 520, process 600 determines whether or not an assignment is needed. If an assignment is needed (i.e., "No" in subprocess 520), process 600 proceeds to subprocess 525. Otherwise, if no assignment is needed (i.e., "Yes" in subprocess 520), process 600 proceeds to subprocess 620.

In subprocess 525, process 600 determines the assignment, and then, in subprocess 530, process 600 determines whether or not an assignment was determined in subprocess 525. If an assignment is available (i.e., "Yes" in subprocess 530), the assignment is made in subprocess 535. Otherwise, if no assignment is available (i.e., "No" in subprocess 530), process 600 may reject the request in subprocess 540.

In subprocess 620, process 600 determines whether or not a satellite reconfiguration is required by the assignment in subprocess 535. If a satellite reconfiguration is required (i.e., "Yes" in subprocess 620), a new configuration for the payload of satellite 120 is defined in subprocess 630. Otherwise, if no satellite reconfiguration is required (i.e., "No" in subprocess 620), process 600 sends a service request to instantiate and execute the service in the production environment to SDN controller 125 in subprocess 545.

In subprocess 575, process 600 may request approval for the payload configuration defined in subprocess 630. If approval is received (i.e., "Yes" in subprocess 575), process 600 may proceed to subprocess 580 to save the save and schedule the payload reconfiguration, and then approve the request, initiated in subprocess 505, in subprocess 585. In addition (e.g., in parallel), process 600 may send a service request to instantiate and execute the service in the production environment to SDN controller 125 in subprocess 545. Otherwise, if approval is not received or disapproval is received ("No" in subprocess 575), process 600 may reject the request in subprocess 540.

7. Monitoring Via Service Chain

In an embodiment, a service chain for monitoring other service chains can be instantiated and managed just like any other service chain. This monitoring service chain may sample the input and/or output of a channelizer in one or more other service chains and perform RF analysis on the sampled signal. For example, the monitoring service chain may perform RF analysis on the digital signal stream to detect or identify problems with the service chain. This is in contrast to traditional RF analysis for hardware-based channelizers, which requires physical access to the hardware and cannot be performed automatically or at scale. Advantageously, since the monitoring service chain is monitoring a digital signal stream, it may record all RF data to a short-term or long-term buffer to aid in troubleshooting transient events (e.g., by analyzing the historical RF data leading up to the transient event).

In an embodiment, if a service chain is determined to be performing unsatisfactorily (e.g., "No" in subprocess 260), one or more instances of the monitoring service chain may be automatically instantiated by service orchestrator 105 or SDN controller 125 (e.g., via network management system 140 and/or NFV orchestrator 135). Once instantiated, the monitoring service chain may sample the input and/or output of the channelizer in the failing service chain and perform RF analysis on the sampled stream to identify the problem with the failing service chain.

In an additional or alternative embodiment, a monitoring service chain may operate continuously to monitor one or more service chains, instead of being instantiated in response to detecting that a service chain is not performing satisfactorily. In this case, the monitoring service chain may be instantiated alongside and in parallel with the service chain(s) being monitored. Again, the monitoring service chain may sample the input and/or output of the channelizer in the service chain(s) and perform RF analysis on the sampled streams in those service chain(s) to detect any problems.

In either case, if a problem is identified or detected, the monitoring service chain may report the problem, directly or indirectly, to a decision-maker, such as service orchestration system 105 or SDN controller 125. The decision maker may then responsively update an affected service chain to correct the problem as needed (e.g., in subprocess 265). As one example, the monitoring service chain may detect an interferer in a service chain and trigger a change in frequency within the service chain to prevent further interference. Notably, one or a plurality of monitoring service chains may be instantiated, updated, and terminated in the same manner as any other service chain. Thus, advantageously, a monitoring service chain can be integrated into infrastructure 100 and treated in the same manner as any other service chain.

In addition, since the monitoring service chain is virtualized, monitoring service chains may be dynamically deployed to increase RF monitoring capacity or dynamically destroyed to decrease RF monitoring capacity (and prevent underutilization of resources), as needed, according to changing circumstances. This is simply not possible in conventional satcom infrastructures with current technologies. For example, assume that the lock with a satellite 120 is temporarily lost on a modem in a service chain 300, and when the modem relocks to satellite 120, it only has 20% of the throughput it had prior to the loss. In a conventional satcom infrastructure, monitoring hardware would need to be transitioned away from a general monitoring plan and dedicated to troubleshooting the problem. In contrast, in the disclosed infrastructure 100, the event may be detected and used to automatically trigger the instantiation of one or a plurality of monitoring service chains, in the same manner as described herein with respect to any service chain. For instance, a first monitoring service chain may be instantiated to focus on the current degraded service, and a second monitoring service chain may be instantiated to replay the event and analyze the RF data to identify what caused the loss of the lock in the first place.

8. Example Processing Device

Figure 7:
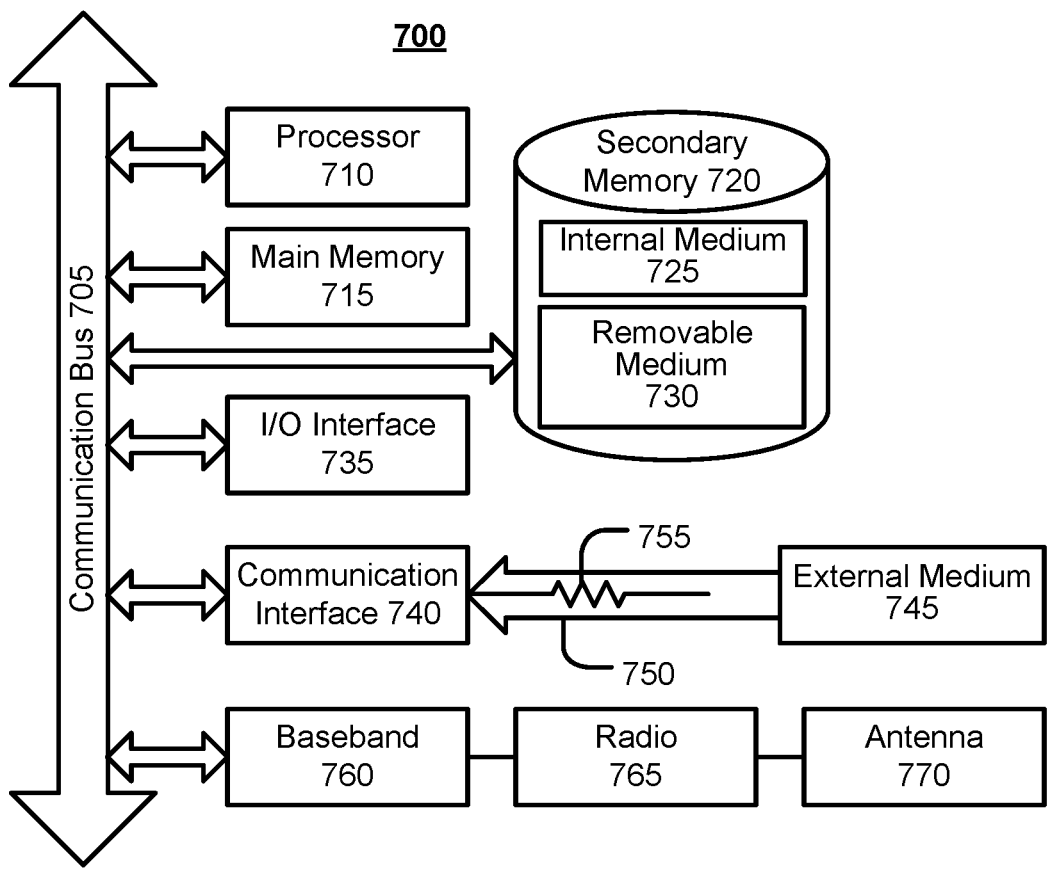
FIG. 7 illustrates an example processing system, by which one or more of the processes described herein, may be executed, according to an embodiment.

FIG. 7 is a block diagram illustrating an example wired or wireless system 700 that may be used in connection with various embodiments described herein. For example, system 700 may be used as or in conjunction with one or more of the functions, processes, or methods (e.g., to store and/or execute the software) described herein, and may represent or host components of infrastructure 100, including service orchestration system 105, payload controller 110, satellite manager 115, satellite 120, SDN controller 125, external resource manager 130, NFV orchestrator 135, network management system 140, external service designer 145, satellite NFV infrastructure 150, terminal NFV infrastructure 160, service 170, and/or consumer 175. System 700 can be a server or any conventional personal computer, or any other processor-enabled device that is capable of wired or wireless data communication. Other computer systems and/or architectures may be also used, as will be clear to those skilled in the art.

System 700 preferably includes one or more processors 710. Processor(s) 710 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a secondary processor subordinate to the main processing system (e.g., back-end processor), an additional microprocessor or controller for dual or multiple processor systems, and/or a coprocessor. Such auxiliary processors may be discrete processors or may be integrated with processor 710. Examples of processors which may be used with system 700 include, without limitation, any of the processors (e.g., Pentium™, Core i7™, Xeon™, etc.) available from Intel Corporation of Santa Clara, California, any of the processors available from Advanced Micro Devices, Incorporated (AMD) of Santa Clara, California, any of the processors (e.g., A series, M series, etc.) available from Apple Inc. of Cupertino, any of the processors (e.g., Exynos™) available from Samsung Electronics Co., Ltd., of Seoul, South Korea, any of the processors available from NXP Semiconductors N.V. of Eindhoven, Netherlands, and/or the like.

Processor 710 is preferably connected to a communication bus 705. Communication bus 705 may include a data channel for facilitating information transfer between storage and other peripheral components of system 700. Furthermore, communication bus 705 may provide a set of signals used for communication with processor 710, including a data bus, address bus, and/or control bus (not shown). Communication bus 705 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the IEEE including IEEE 488 general-purpose interface bus (GPIB), IEEE 696/S-100, and/or the like.

System 700 preferably includes a main memory 715 and may also include a secondary memory 720. Main memory 715 provides storage of instructions and data for programs executing on processor 710, such as any of the software discussed herein. It should be understood that programs stored in the memory and executed by processor 710 may be written and/or compiled according to any suitable language, including without limitation C/C++, Java, JavaScript, Perl, Visual Basic, .NET, and the like. Main memory 715 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 720 is a non-transitory computer-readable medium having computer-executable code (e.g., any of the software disclosed herein) and/or other data stored thereon. The computer software or data stored on secondary memory 720 is read into main memory 715 for execution by processor 710. Secondary memory 720 may include, for example, semiconductor-based memory, such as programmable read-only memory (PROM), erasable programmable read-only memory (EPROM), electrically erasable read-only memory (EEPROM), and flash memory (block-oriented memory similar to EEPROM).

Secondary memory 720 may optionally include an internal medium 725 and/or a removable medium 730. Removable medium 730 is read from and/or written to in any well-known manner. Removable storage medium 730 may be, for example, a magnetic tape drive, a compact disc (CD) drive, a digital versatile disc (DVD) drive, other optical drive, a flash memory drive, and/or the like.

In alternative embodiments, secondary memory 720 may include other similar means for allowing computer programs or other data or instructions to be loaded into system 700. Such means may include, for example, a communication interface 740, which allows software and data to be transferred from external storage medium 745 to system 700. Examples of external storage medium 745 include an external hard disk drive, an external optical drive, an external magneto-optical drive, and/or the like.

As mentioned above, system 700 may include a communication interface 740. Communication interface 740 allows software and data to be transferred between system 700 and external devices, networks, or other information sources. For example, computer software or executable code may be transferred to system 700 from a network server via communication interface 740. Examples of communication interface 740 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 700 with a network or another computing device. Communication interface 740 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 740 are generally in the form of electrical communication signals 755. These signals 755 may be provided to communication interface 740 via a communication channel 750. In an embodiment, communication channel 750 may be a wired or wireless network, or any variety of other communication links. Communication channel 750 carries signals 755 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, such as the disclosed software) is stored in main memory 715 and/or secondary memory 720. Computer-executable code can also be received via communication interface 740 and stored in main memory 715 and/or secondary memory 720. Such computer programs, when executed, enable system 700 to perform the various functions of the disclosed embodiments as described elsewhere herein.

In this description, the term "computer-readable medium" is used to refer to any non-transitory computer-readable storage media used to provide computer-executable code and/or other data to or within system 700. Examples of such media include main memory 715, secondary memory 720 (including internal memory 725 and removable medium 730), external storage medium 745, and any peripheral device communicatively coupled with communication interface 740 (including a network information server or other network device). These non-transitory computer-readable media are means for providing software and/or other data to system 700.

In an embodiment that is implemented using software, the software may be stored on a computer-readable medium and loaded into system 700 by way of removable medium 730, I/O interface 735, or communication interface 740. In such an embodiment, the software is loaded into system 700 in the form of electrical communication signals 755. The software, when executed by processor 710, preferably causes processor 710 to perform one or more of the processes and functions described elsewhere herein.

In an embodiment, I/O interface 735 provides an interface between one or more components of system 700 and one or more input and/or output devices. Example input devices include, without limitation, sensors, keyboards, touch screens or other touch-sensitive devices, cameras, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet, or other mobile device).

System 700 may also include optional wireless communication components that facilitate wireless communication over a voice network and/or a data network. The wireless communication components comprise an antenna system 770, a radio system 765, and a baseband system 760. In system 700, radio frequency (RF) signals are transmitted and received over the air by antenna system 770 under the management of radio system 765.

In an embodiment, antenna system 770 may comprise one or more antennae and one or more multiplexors (not shown) that perform a switching function to provide antenna system 770 with transmit and receive signal paths. In the receive path, received RF signals can be coupled from a multiplexor to a low noise amplifier (not shown) that amplifies the received RF signal and sends the amplified signal to radio system 765.

In an alternative embodiment, radio system 765 may comprise one or more radios that are configured to communicate over various frequencies. In an embodiment, radio system 765 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 765 to baseband system 760.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A method comprising, by a software-defined network (SDN) controller:
   receiving a service request comprising a service definition for an end-to-end service;
   calculating one or more parameters of a satellite link that satisfies the service definition;
   selecting a configuration for a satellite-network service chain from a service catalog based on the calculated one or more parameters, wherein the satellite-network service chain comprises a plurality of virtual network functions; and
   initiating instantiation of the satellite-network service chain in the selected configuration.

2. The method of claim 1, wherein the service request is received from a service orchestration system over at least one network, and wherein the method further comprises, by the SDN controller, prior to receiving the service request:
   receiving a request for service interface points from the service orchestration system over the at least one network; and,
   in response to the request, retrieving a list of available service interface points, and sending the list of available service interface points to the service orchestration system over the at least one network.

3. The method of claim 2, wherein retrieving the list of available service interface points comprises retrieving a list of gateways and terminals via an application programming interface of a network management system over the at least one network.

4. The method of claim 1, wherein the service definition defines a Carrier Ethernet (CE) service.

5. The method of claim 1, wherein the service definition identifies a gateway and a terminal and comprises one or more service parameters that define a service level agreement.

6. The method of claim 5, wherein the one or more service parameters comprise a committed information rate and an excess information rate.

7. The method of claim 6, wherein the one or more service parameters further comprise a maximum information rate.

8. The method of claim 5, further comprising, after instantiation of the satellite-network service chain:
   monitoring one or more key performance indicators of the satellite-network service chain; and,
   when the one or more key performance indicators do not satisfy the service parameters, select a new configuration for the satellite-network service chain from the service catalog based on the calculated one or more parameters, and update the satellite-network service chain to the new configuration.

9. The method of claim 8, wherein updating the satellite-network service chain comprises instantiating a new satellite-network service chain in the new configuration, migrating traffic from the satellite-network service chain to the new satellite-network service chain, and terminating the satellite-network service chain in the configuration.

10. The method of claim 1, wherein the one or more parameters are a link budget.

11. The method of claim 1, wherein the configuration comprises one or more dimensions of computing resources to be allocated to the plurality of virtual network functions in a cloud computing environment.

12. The method of claim 1, wherein initiating instantiation of the satellite-network service chain comprises sending a service chain request, comprising the configuration, to a network management system over at least one network.

13. The method of claim 12, further comprising, by the network management system:
   receiving the service chain request from the SDN controller over the at least one network; and,
   in response to the service chain request, sending an instantiation request to a network functions virtualization (NFV) orchestrator over the at least one network.

14. The method of claim 13, further comprising, by the NFV orchestrator:
   receiving the instantiation request from the network management system over the at least one network; and,
   in response to the instantiation request, instantiating the plurality of virtual network functions within a cloud computing environment.

15. The method of claim 13, wherein the instantiation request comprises a gateway configuration for a satellite service chain, and wherein the method further comprises, by the network management system in response to the service chain request, sending a terminal configuration for a terminal service chain to a terminal configuration service.

16. The method of claim 1, wherein the plurality of virtual network functions comprises one or both of:
   an encapsulator and a modulator that convert Ethernet packets to satellite frames; or
   a demodulator and decapsulator that convert satellite frames to Ethernet packets.

17. The method of claim 1, further comprising:
   instantiating the satellite-network service chain in a sandbox environment, wherein the plurality of virtual network functions comprises one or more virtual network functions that simulate the satellite link; and acquiring performance parameters of the satellite-network service chain in the sandbox environment.

18. The method of claim 1, further comprising reconfiguring the satellite-network service chain in the sandbox environment based on the acquired performance parameters.

19. The method of claim 1, further comprising, by the SDN controller:
  receiving a service request comprising a service definition for a monitoring service;
  determining a configuration for a monitoring service chain for the monitoring service; and
  initiating instantiation of the monitoring service chain in the determined configuration, wherein the monitoring service chain performs analysis on a digital signal stream in the satellite-network service chain.

20. The method of claim 1, wherein the plurality of virtual network functions comprises a virtualized modem including at least one demodulator configured to demodulate waveforms according to a Digital Video Broadcasting (DVB) standard, at least one modulator configured to modulate waveforms according to the DVB standard, at least one encapsulator, and at least one decapsulator.

21. The method of claim 20, wherein the virtualized modem provides Carrier Ethernet services.

22. A system comprising:
  at least one hardware processor; and
  one or more software modules that are configured to, when executed by the at least one hardware processor,
    receive a service request comprising a service definition for an end-to-end service,
    calculate one or more parameters of a satellite link that satisfies the service definition,
    select a configuration for a satellite-network service chain from a service catalog based on the calculated one or more parameters, wherein the satellite-network service chain comprises a plurality of virtual network functions, and
    initiate instantiation of the satellite-network service chain in the selected configuration.

23. A non-transitory computer-readable medium having instructions stored therein, wherein the instructions, when executed by a processor, cause the processor to:
  receive a service request comprising a service definition for an end-to-end service;
  calculate one or more parameters of a satellite link that satisfies the service definition;
  select a configuration for a satellite-network service chain from a service catalog based on the calculated one or more parameters, wherein the satellite-network service chain comprises a plurality of virtual network functions; and
  initiate instantiation of the satellite-network service chain in the selected configuration.

\* \* \* \* \*